(12) United States Patent
Nishihashi et al.

(10) Patent No.: US 10,137,781 B2
(45) Date of Patent: Nov. 27, 2018

(54) INPUT DEVICE

(71) Applicant: DENSO CORPORATION, Kariya, Aichi-pref. (JP)

(72) Inventors: Shigeaki Nishihashi, Kariya (JP); Takeyuki Fujimoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 133 days.

(21) Appl. No.: 14/908,613

(22) PCT Filed: Jul. 24, 2014

(86) PCT No.: PCT/JP2014/003902
§ 371 (c)(1),
(2) Date: Jan. 29, 2016

(87) PCT Pub. No.: WO2015/015772
PCT Pub. Date: Feb. 5, 2015

(65) Prior Publication Data
US 2016/0167517 A1    Jun. 16, 2016

(30) Foreign Application Priority Data

Aug. 2, 2013    (JP) ................................ 2013-161669

(51) Int. Cl.
*G06F 3/044*    (2006.01)
*B60K 37/06*    (2006.01)
(Continued)

(52) U.S. Cl.
CPC .............. *B60K 37/06* (2013.01); *B60K 35/00* (2013.01); *B60K 37/04* (2013.01); *G06F 3/044* (2013.01);
(Continued)

(58) Field of Classification Search
None
See application file for complete search history.

(56) References Cited

U.S. PATENT DOCUMENTS

| 9,384,166 B2* | 7/2016 | Kojima ................. B60K 37/06 |
| 2007/0244613 A1* | 10/2007 | Ishikawa ............... B60K 37/06 |
| | | 701/29.2 |

(Continued)

FOREIGN PATENT DOCUMENTS

| JP | 2007302223 A | 11/2007 |
| JP | 2008265511 A | 11/2008 |

(Continued)

OTHER PUBLICATIONS

International Search Report and Written Opinion (in Japanese with English Translation) for PCT/JP2014/003902, dated Sep. 30, 2014; ISA/JP.

*Primary Examiner* — Amare Mengistu
*Assistant Examiner* — Shawna Stepp Jones
(74) *Attorney, Agent, or Firm* — Harness, Dickey & Pierce, P.L.C.

(57) ABSTRACT

An input device includes: an operation surface, on which an operation body performs an input; a distance acquisition unit acquiring a distance between the operation surface and the operation body; an operation region setting unit setting a first operation region, in which the distance is less than a threshold value, and a second operation region, in which the distance is equal to or greater than the threshold value; a display screen switching unit detecting a moving operation of the operation body, and switching the display screen; a prohibition state setting unit setting a prohibition state that the display screen is not switched by the moving operation in the second operation region; a signal determination unit determining whether a signal from a switching operation unit is a prohibition state cancellation signal; and a prohi- (Continued)

bition state cancellation unit cancelling the prohibition state in case of the prohibition state cancellation signal.

7 Claims, 19 Drawing Sheets

(51) Int. Cl.
    *B60K 35/00*     (2006.01)
    *G06F 3/0488*     (2013.01)
    *B60K 37/04*     (2006.01)
    *G06F 3/041*     (2006.01)

(52) U.S. Cl.
    CPC .......... *G06F 3/0416* (2013.01); *G06F 3/0488* (2013.01); *B60K 2350/1012* (2013.01); *B60K 2350/1032* (2013.01); *G06F 2203/04101* (2013.01)

(56) References Cited

U.S. PATENT DOCUMENTS

| | | |
|---|---|---|
| 2011/0128164 A1 | 6/2011 | Kang et al. |
| 2012/0019460 A1 | 1/2012 | Matsubara et al. |
| 2015/0205943 A1 | 7/2015 | Takenaka et al. |
| 2015/0242102 A1 | 8/2015 | Enami et al. |

FOREIGN PATENT DOCUMENTS

| | | |
|---|---|---|
| JP | 2011118857 A | 6/2011 |
| JP | 2012027515 A | 2/2012 |
| JP | 2014059863 A | 4/2014 |
| WO | WO2016/031152 | 3/2016 |

\* cited by examiner

FIG. 7
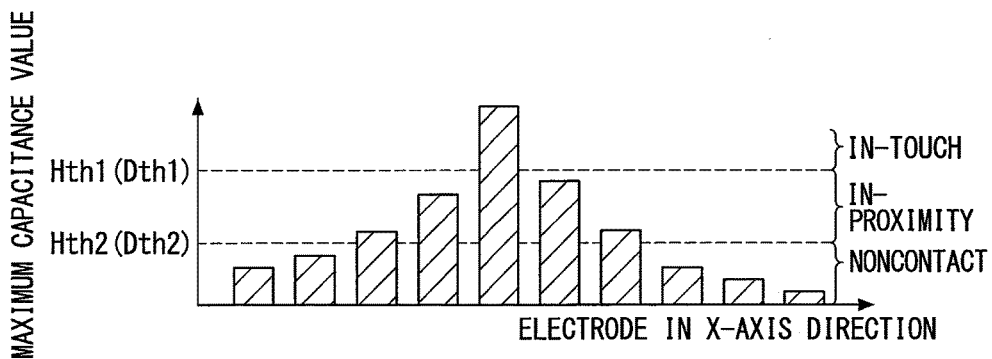
FIG. 8
| | THRESHOLD VALUE OF MAXIMUM CAPACITANCE VALUE |
|---|---|
| Hth1 | 200 |
| Hth2 | 100 |
FIG. 9
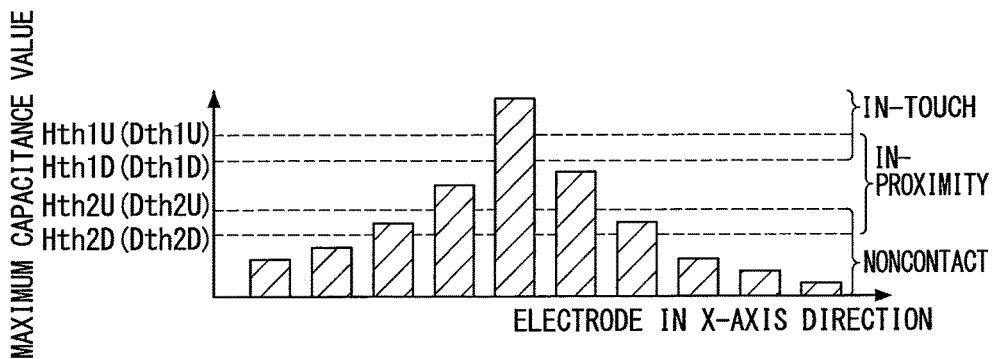

| | THRESHOLD VALUE OF MAXIMUM CAPACITANCE VALUE |
|---|---|
| Hth1U | 200 |
| Hth1D | 180 |
| Hth2U | 100 |
| Hth2D | 80 |

SUBROUTINE 1
(PROCESS OF IN-PROXIMITY FLAG)

SUBROUTINE 3 (PROCESS OF IN-TOUCH OPERATION)

SUBROUTINE 3 (PROCESS OF IN-PROXIMITY OPERATION)

SUBROUTINE 4 (PROCESS OF IN-TOUCH OPERATION)

INPUT DEVICE

CROSS REFERENCE TO RELATED APPLICATIONS

This application is a U.S. National Phase Application under 35 U.S.C. 371 of International Application No. PCT/JP2014/003902 filed on Jul. 24, 2014 and published in Japanese as WO 2015/015772 A1 on Feb. 5, 2015. This application is based on and claims the benefit of priority from Japanese Patent Application No. 2013-161669 filed on Aug. 2, 2013. The entire disclosures of all of the above applications are incorporated herein by reference.

TECHNICAL FIELD

The present disclosure relates to an input device for operating a display device of a vehicle.

BACKGROUND ART

An input device, capable of performing an aerial operation input, which is disclosed in Patent Literature 1 as an example of a vehicle input device has been known.

However, in the input device disclosed in Patent Literature 1, a clear switching method is not disclosed with regard to switching between a contact operation and an aerial operation. For this reason, in the input device of Patent Literature 1, there is the possibility of a user erroneously performing an aerial operation, and thus there is a problem of poor operability.

PRIOR ART LITERATURES

Patent Literature

Patent Literature 1: JP-2011-118857 A

SUMMARY OF INVENTION

It is an object of the present disclosure to provide a vehicle input device which clearly switches between a contact operation and an aerial operation.

According to a first aspect of the present disclosure, an input device mounted on a vehicle with a display device, includes: an operation surface, on which an operation body performs an input for switching a display screen of the display device; a distance acquisition unit that acquires a measurement value, which varies according to a distance between the operation surface and the operation body; an operation region setting unit that sets a first operation region, in which the distance between the operation surface and the operation body is less than a threshold value, and a second operation region, in which the distance between the operation surface and the operation body is equal to or greater than the threshold value; a display screen switching unit that detects a movement of the operation body in the first operation region or the second operation region as a moving operation, and switches the display screen; a prohibition state setting unit that sets a prohibition state that the display screen is not switched by the moving operation in the second operation region; a signal determination unit that receives a predetermined signal from a switching operation unit arranged at a position separated from an area above the operation surface, and determines whether the signal is a prohibition state cancellation signal for canceling the prohibition state; and a prohibition state cancellation unit that cancels the prohibition state when the signal determination unit determines that the signal is the prohibition state cancellation signal.

In the above-mentioned input device, even when the operation body is moved in the second operation region in the case of the prohibition state, the display screen of the display device is not switched. Even when a user erroneously moves the operation body in the second operation region, the display screen of the display device is not switched.

In addition, when a user intentionally operates the switching operation unit to cancel the prohibition state, the display screen of the display device can be switched by the movement of the operation body in the second operation region. Therefore, the possibility of the user erroneously performing an aerial operation can be reduced.

According to a second aspect of the present disclosure, an input device mounted on a vehicle with a display device, includes: an operation surface, on which an operation body performs an input; a distance acquisition unit that acquires a distance between the operation surface and the operation body; a display control unit that detects a movement of the operation body on the operation surface, and switches the display screen; a guide unit that is arranged at a position separated from the operation surface by a predetermined distance along a direction toward the operation surface, and has a predetermined length; a mode switching operation detection unit that detects the movement of the operation body along the guide unit; and a mode switching unit that switches between an aerial operation prohibition mode for reflecting only the movement of the operation body, in which a distance between the operation surface and the operation body is within a predetermined distance, on a switching operation of the display screen, and an aerial operation permission mode for additionally reflecting an operation of the moving body, in which the distance between the operation surface and the operation body exceeds the predetermined distance, on the switching operation of the display screen> The mode switching unit switches the aerial operation prohibition mode to the aerial operation permission mode when the mode switching operation detection unit detects that the operation body moves along the guide unit.

In the above-mentioned input device, a user can freely switch between the aerial operation prohibition mode and the aerial operation permissible mode, and the switching of the display screen which is different from the user's intention can be reduced.

BRIEF DESCRIPTION OF DRAWINGS

The above and other objects, features and advantages of the present disclosure will become more apparent from the following detailed description made with reference to the accompanying drawings. In the drawings:

FIG. 7 is a diagram illustrating switching between operation states, in the first embodiment of this disclosure;

FIG. 8 is a diagram illustrating a relationship between an operation state and a maximum capacitance value, in the first embodiment of this disclosure;

FIG. 9 is a diagram illustrating switching between operation states which is not frequently performed, in a modification example of this disclosure;

EMBODIMENTS FOR CARRYING OUT INVENTION

Figure 1:
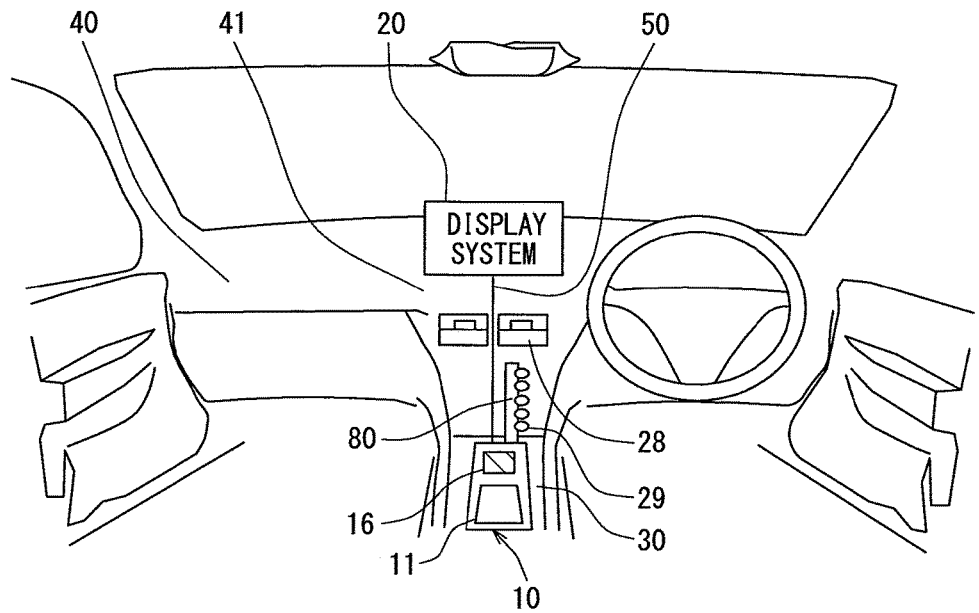
FIG. 1 is a diagram illustrating an arrangement relationship between a display device and an input device in a vehicle interior, in a first embodiment of this disclosure.

Hereinafter, embodiments of this disclosure will be described with reference to the accompanying drawings. Meanwhile, in the embodiments, corresponding components are denoted by the same reference numerals and signs, and a repeated description thereof may be omitted. In the embodiments, when only a portion of a configuration is described, a configuration of the preceding embodiment can be applied to the other portions of the configuration. In addition to a combination of configurations explicitly stated in a description of each embodiment, configurations of the multiple embodiments can be partially combined together even if not explicitly stated, if no problem particularly occurs in the combination.

First Embodiment

Hereinafter, a first embodiment of this disclosure will be described with reference to FIGS. 1 to 18. FIG. 1 is a diagram illustrating the arrangement of an input device and a display device in a vehicle interior. The input device of this embodiment is a so-called remote operation device 10 which is provided separately from the display device. The display device is a multi-information display system 20 (hereinafter, simply referred to as a display system 20), such as a car navigation device, an audio, a telephone, or an air conditioner, which displays an operation panel screen to be described later. In addition, the display system 20 also displays a setting screen for adjusting the brightness, a character size, and the like of the display system 20 itself. The remote operation device 10 is disposed on a center console 30. The display system 20 is disposed in the middle of a dashboard 40. The remote operation device 10 and the display system 20 are connected to each other through a controller area network 50 (hereinafter, CAN 50).

A center cluster 41 connecting a center portion of the dashboard 40 in a horizontal direction of the vehicle and the center console 30 is provided with a guide unit 80, having a predetermined length (10 cm or greater in this embodiment), which is provided as a switching operation unit toward the remote operation device 10 from a position separated from the remote operation device 10 by a predetermined distance. Specifically, an end of the guide unit 80 is provided from the below of an air conditioner blowout port 28 disposed in the center cluster 41 toward a position adjacent to the remote operation device 10.

In addition, the guide unit 80 in this embodiment is constituted by an elongated capacitance sensor formed of a conductor, and can measure an amount of a substance by capacitance generated between the conductor and an operation body (hereinafter, a finger) such as a finger that approaches the conductor to thereby detect the approach of the finger to the guide unit 80 and the moving direction thereof.

The guide unit 80 in this embodiment is provided with multiple light emitting diodes 29 along the longitudinal direction thereof. The multiple light emitting diodes 29 are controlled so as to emit light in association with the movement of the finger. Therefore, a user can ascertain that the finger can appropriately move along the guide unit 80.

Figure 2:
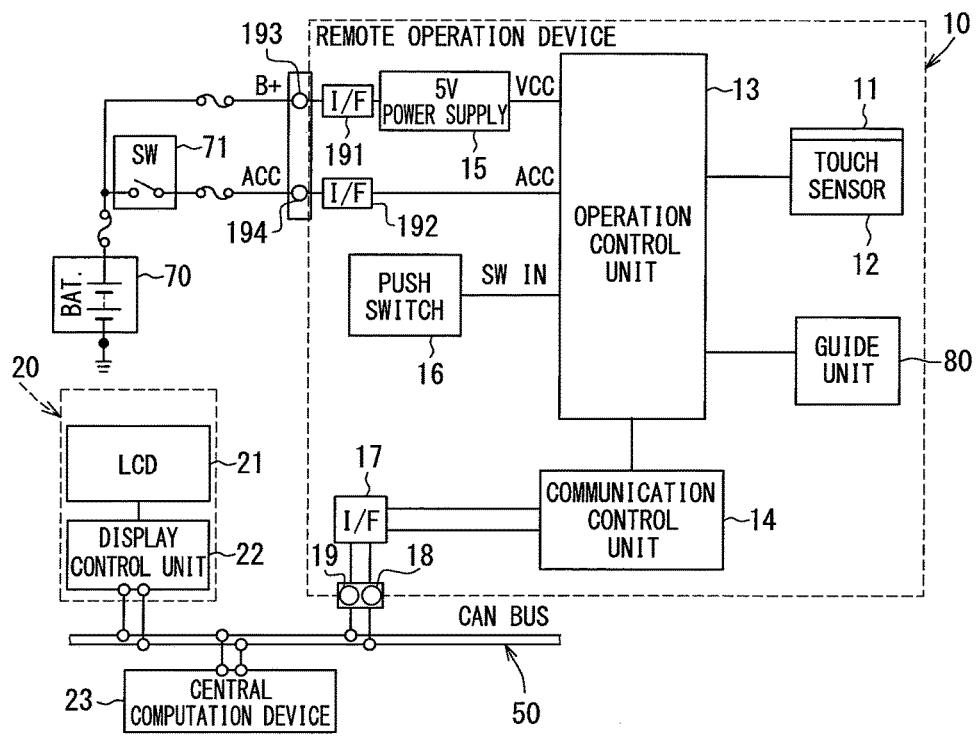
FIG. 2 is a diagram illustrating configurations of the display device and the input device, in the first embodiment of this disclosure.

Next, the remote operation device 10 and the display system 20 in this embodiment will be described in more detail with reference to FIG. 2. The remote operation device 10 includes a capacitance type touch sensor 12 covered by a design panel 11 which is an operation surface in this embodiment. The capacitance type touch sensor 12 is a distance acquisition unit in this embodiment, and can not only detect a contact of a finger with the design panel 11 but also detect an in-proximity operation only when the finger approaches the surface of the design panel 11.

Figure 3:
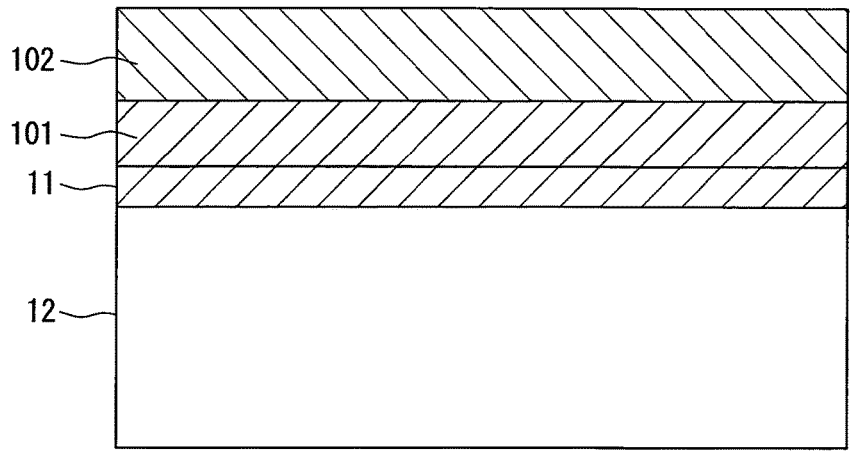
FIG. 3 is a diagram illustrating a first operation region and a second operation region of the input device, in the first embodiment of this disclosure.

Specifically, when a finger is positioned in an in-touch region 101 illustrated in FIG. 3, the remote operation device 10 determines that the finger has come into contact with the design panel 11. When the finger is positioned only in a space indicated by an in-proximity operation region 102, the remote operation device 10 determines that the finger performs an in-proximity operation only when the finger approaches the design panel 11.

In addition, the guide unit 80 is disposed at a position separated from a space above the design panel 11 of the capacitance type touch sensor 12.

Next, a configuration of the remote operation device 10 will be described. The remote operation device 10 is connected to a central computation device 23 through the CAN 50. In addition, the central computation device 23 is connected to a control device of each component mounted on the vehicle. The control devices of the respective components are, for example, a car navigation device ECU, an air conditioner ECU, an audio ECU, an external connection ECU, and the like which are not shown in the drawing. The remote operation device 10 transmits an operation input signal for each component mentioned above to the central computation device 23. The central computation device 23 performs an operation input on each component on the basis of the operation input signal received from the remote operation device 10. In other words, a user can perform an operation input on a component using the remote operation device 10.

The remote operation device 10 transmits an operation input signal to the central computation device 23 and also transmits an operation input signal to the display system 20 by communication through the CAN 50. The display system 20 displays an operation panel screen, an icon, and the like on LCD 21 on the basis of the received operation input signal. The operation panel screen is a screen corresponding to a component operated by the remote operation device 10. The icon visually represents an operation input which is performed on each component by the remote input device 10. In other words, the display system 20 displays an operation panel screen and an icon which correspond to an operation target when the remote operation device 10 performs an operation input on a component. Therefore, when a user performs a predetermined operation input on an icon on the display system 20 using the remote operation device 10, the user can perform an operation input corresponding to each component.

The display system 20 includes a liquid crystal display (hereinafter, an LCD) 21 and a display control unit 22. The display control unit 22 is constituted by a processor performing various types of computation processes, a RAM functioning as a work area for a computation process, a graphic processor performing an image drawing process, a graphic RAM functioning as a work area for a drawing process, and the like which are not shown in the drawing. The display control unit 22 performs a drawing process on the basis of the operation input signal received from the remote operation device 10 through the central computation device 23 to thereby display an image on the LCD 21. The image displayed on the LCD 21 displays an operation panel screen and an icon of a component on which an operation input is performed by the remote operation device 10.

In addition, the remote operation device 10 includes the design panel 11, the touch sensor 12, an operation control unit 13, a communication control unit 14, a 5 V power supply 15, and a push switch 16. In addition, the remote operation device 10 includes a communication interface 17, a CAN-H connection unit 18, a CAN-L connection unit 19, a VCC power supply interface 191, an ACC power supply interface 192, a battery power supply connection location 193, and an ACC power supply connection unit 194.

The design panel 11 has a rectangular flat plate shape. When a driver's seat side in the horizontal direction of a vehicle is set to be an x-axis and a travel direction side of the vehicle is set to be a y-axis with respect to a location in which the design panel 11 is disposed, the touch sensor 12 formed by arraying multiple electrodes extending along the x-axis and multiple electrodes extending along the y-axis in a lattice shape is provided on the back face of the design panel 11. When a finger approaches a location in which the electrodes of the touch sensor 12 in the x-axis direction and the electrodes of the touch sensor in the y-axis direction cross each other, a value of the capacitance of the crossing location varies. The electrodes in the x-axis direction and the electrodes in the y-axis direction are connected to the operation control unit 13.

The operation control unit 13 is a display screen switching unit, a prohibition state setting unit, a signal determination unit, and a prohibition state cancellation unit in this embodiment. The operation control unit 13 is constituted by a processor performing various types of computation processes, a RAM functioning as a work area for the computation process, a flash memory storing a program and the like used in the computation process, and the like.

The operation control unit 13 is connected to the touch sensor 12. In addition, the operation control unit 13 is connected to the communication control unit 14. In addition, the operation control unit 13 is connected to the 5 V power supply 15. In addition, the operation control unit 13 is connected to the push switch 16. In addition, the operation control unit 13 is connected to the ACC power supply interface 192. The 5 V power supply 15 is connected to the VCC power supply interface 191. The VCC power supply interface 191 is connected to a battery 70 through the battery power supply connection location 193. The ACC power supply interface 192 is connected to the battery 70 through the ACC power supply connection location 194 and a switch 71. The communication control unit 14 is connected to the communication interface 17. The communication interface 17 is connected to the CAN 50 through the CAN-H connection location 18 and the CAN-L connection location 19.

The CAN 50 is connected to the central computation device 23 and the display system 20.

First, the supply of power to the operation control unit 13 will be described. When an accessory (ACC) power supply of a vehicle is turned on, the battery 70 supplies the ACC power supply to the operation control unit 13 through the ACC power supply interface 192. When the operation control unit 13 receives power supplied from an ACC power supply system, the 5 V power supply 15 is turned on, the voltage of the battery 70 is converted into 5 V through the VCC power supply interface 191 to start the supply of power to the operation control unit 13.

Next, an operation control of the remote operation device 10 will be described. The operation control unit 13 measures the potential of each electrode of the touch sensor 12, and acquires a capacitance value of a location in which the electrodes cross each other, as a measurement value. The operation control unit 13 detects a location having a greatest change in a capacitance value, among the acquired capacitance values, compared to a normal occasion when a finger does not approach a touch sensor. As described above, a location having a great change in a capacitance value is assumed to be a location which a finger approaches. In other words, the operation control unit 13 can detect a variation in a maximum capacitance value to thereby detect a distance between a finger and the design panel 11. In addition, the operation control unit 13 can detect a location having a greatest change in a capacitance value to thereby detect a location which a finger approaches on the touch panel. In addition, when a pressing operation is performed on the push switch 16, the operation control unit 13 performs a determination operation input. The operation control unit 13 switches a component to which an operation input signal is transmitted and switches an operation input signal for each component, on the basis of positional information and determination operation information of the detected finger. The contents of the operation input signal of the operation control unit 13 will be described later.

Next, communication between the remote operation device 10 and each component mounted on the above-mentioned vehicle will be described. The communication control unit 14 transmits an operation input signal created by the operation control unit 13 to the central computation device 23 and the display system 20 through the communication interface 17 and the CAN 50.

Figure 4:
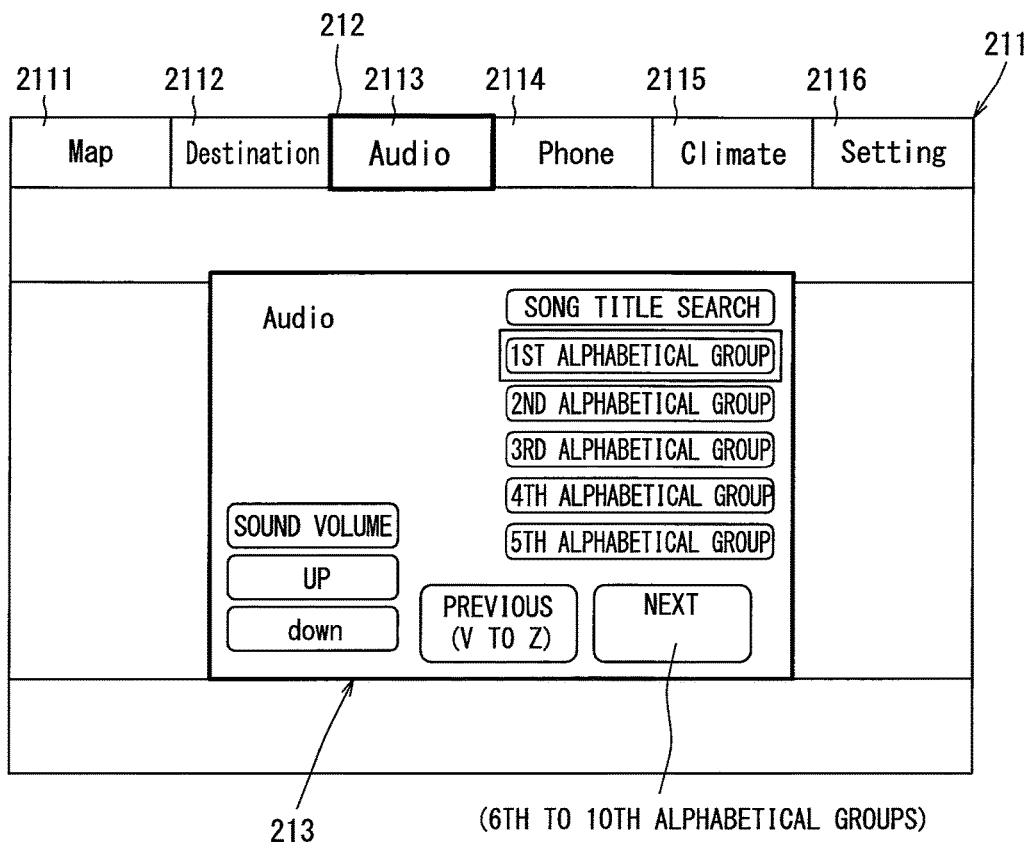
FIG. 4 is a diagram illustrating switching between operation panel screens displayed on the display device, in the first embodiment of this disclosure.

FIG. 4 illustrates a screen displayed on the LCD 21 when a component operated by the remote operation device 10 is switched. The LCD 21 displays a screen switching icon 211 on an upper part of the screen. The types of screen switching icon 211 include a Map icon 2111, a Destination icon 2112, an Audio icon 2113, a Phone icon 2114, a Climate icon 2115, and a Setting icon 2116. In addition, the LCD 21 displays a selection icon 212 on the screen switching icon 211 in an overlapping manner. In addition, the LCD 21 displays an operation panel screen 213 of a component operated by the remote operation device 10. The screen switching icon 211 corresponds to component switching performed by the remote operation device 10. In addition, the selection icon 212 is displayed on the screen switching icon 211 corresponding to the component switching of the remote operation device 10 in an overlapping manner. In other words, when the selection icon 212 is displayed on the screen switching icon 211 in an overlapping manner by the remote operation device 10, the LCD 21 displays the operation panel screen 213 corresponding to the screen switching icon 211.

Figure 5:
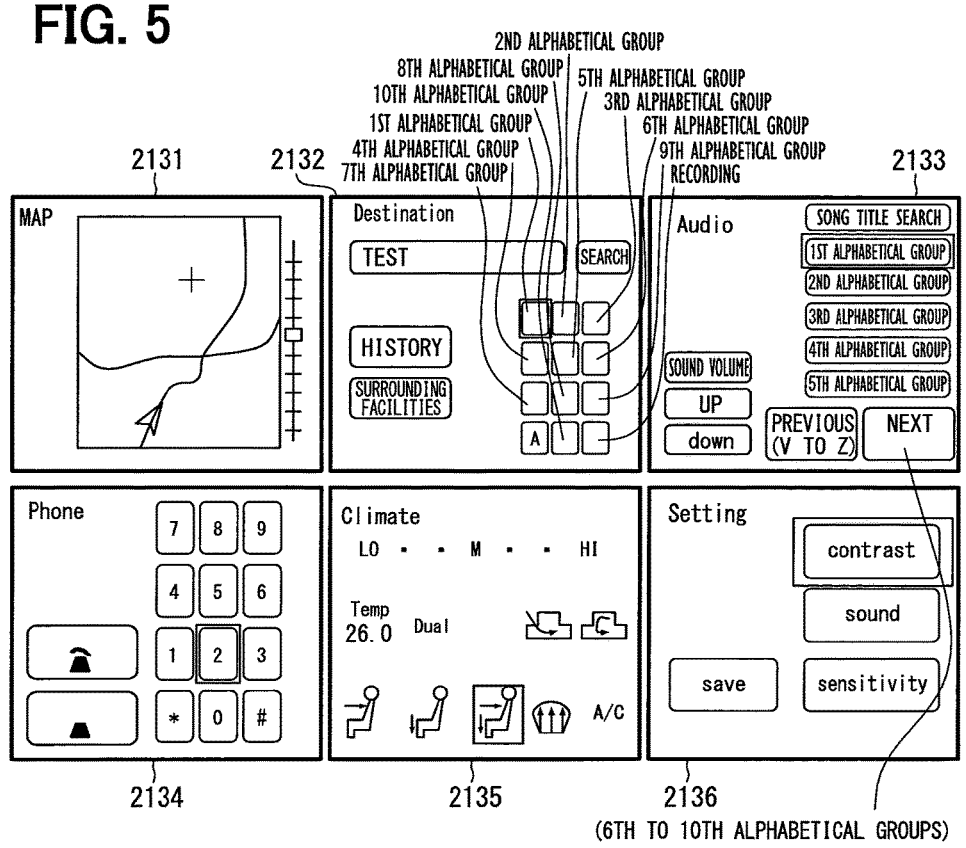
FIG. 5 is a diagram illustrating types of screen displayed on the display device, in the first embodiment of this disclosure.

FIG. 5 illustrates types of screens of the operation panel screen 213 displayed on the LCD 21. In the operation panel screen 213, a screen corresponding to a component operated by the remote operation device 10 is displayed. The operation panel screen 213 displayed on the LCD 21 includes a Map screen 2131 displaying a map and a present location, a Destination screen 2132 for setting a destination, an Audio screen 2133 for performing music selection and volume adjustment, a Phone screen 2134 which is a screen for inputting a phone number, and a Climate screen 2135 which is a screen for managing the temperature and air volume of an air conditioner. In addition, the LCD 21 displays a Setting screen 2136 for performing various types of settings of the display system 20.

Figure 6:
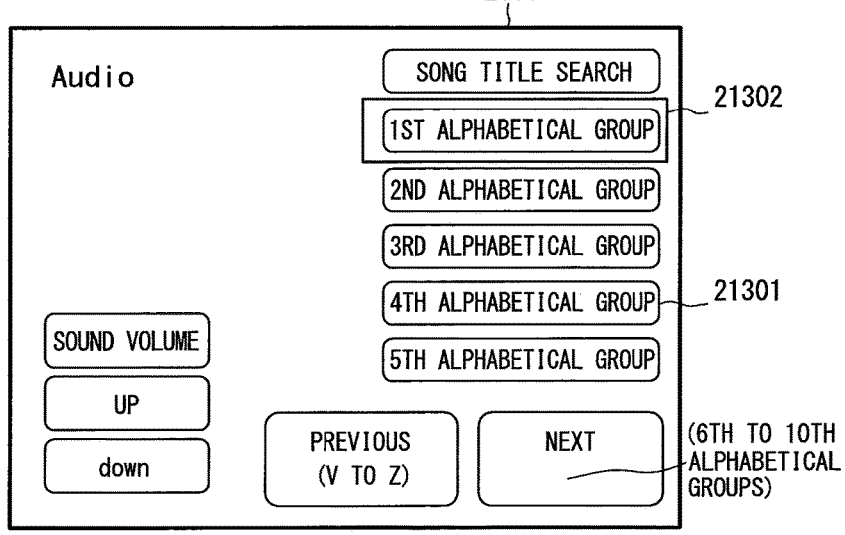
FIG. 6 is a diagram illustrating a state where switching between icons is performed in the operation panel screen, in the first embodiment of this disclosure.

FIG. 6 illustrates an example of a screen displayed on the LCD 21 when an operation input signal is input to a component selected by the remote operation device 10. For example, at present, as a result of the selection of the Audio icon 2113, the LCD 21 displays the Audio screen 2133. An operation input icon 21301 visually shows contents of an operation input performed on Audio by the remote operation device 10. A square operation input marker 21302 surrounds the operation input icon 21301 for which the remote operation device 10 presently attempts to perform an operation input. For example, in FIG. 6, the operation input icon 21301 of a row A in a song title search is surrounded by the operation input marker 21302. The operation input marker 21302 surrounds the operation input icon 21301 visually showing contents of an operation input which is presently performed on an Audio component by the remote operation device 10. In other words, a user moves the operation input marker 21302 using the remote operation device 10, surrounds the operation input icon 21301 by the operation input marker 21302, and transmits an operation input signal of the operation input icon 21301 surrounded by the operation input marker 21302 to a component when a determination operation input is performed.

Next, an operation control of the operation control unit 13 will be described. The operation control unit 13 detects a maximum capacitance value among capacitance values acquired from the touch sensor 12 to thereby detect positional information of a finger. A method of detecting position coordinates will be described later. The operation control unit 13 selects a component and performs an operation input on the selected component in accordance with the detected positional information of the finger and the size of the maximum capacitance value. First, a relationship between the maximum capacitance value and an operation input of the operation control unit 13 will be described. The operation control unit 13 switches an operation state in accordance with the size of the acquired maximum capacitance value. The operation state is classified into three states of in-touch, in-proximity, and in-noncontact.

FIG. 7 illustrates a relationship between a maximum capacitance value and an operation state. The operation control unit 13 stores a threshold value of a maximum capacitance value. The operation control unit 13 sets a range between threshold values. The operation control unit 13 switches an operation state according to in which range a maximum capacitance value detected is included between the threshold values, at the time of the approach or contact of a finger. In FIG. 8, Hth1 and Hth2 denote a threshold value of a maximum capacitance value. In this embodiment, the threshold values of Hth1 and Hth2 are 200 and 100, respectively. As a distance between the design panel 11 and a finger decreases, the maximum capacitance value becomes larger. First, when the maximum capacitance value is equal to or greater than Hth1 (hereinafter, an in-touch region), the operation control unit 13 sets an operation state to be in-touch. When the maximum capacitance value is in a range of equal to or greater than Hth2 to less than Hth1 (hereinafter, an in-proximity region), the operation control unit 13 sets an operation state to be in-proximity. When the maximum capacitance value is in a range of less than Hth2 (hereinafter, an in-noncontact region), the operation control unit 13 sets an operation state to be non-contact.

Figures 10, 11:
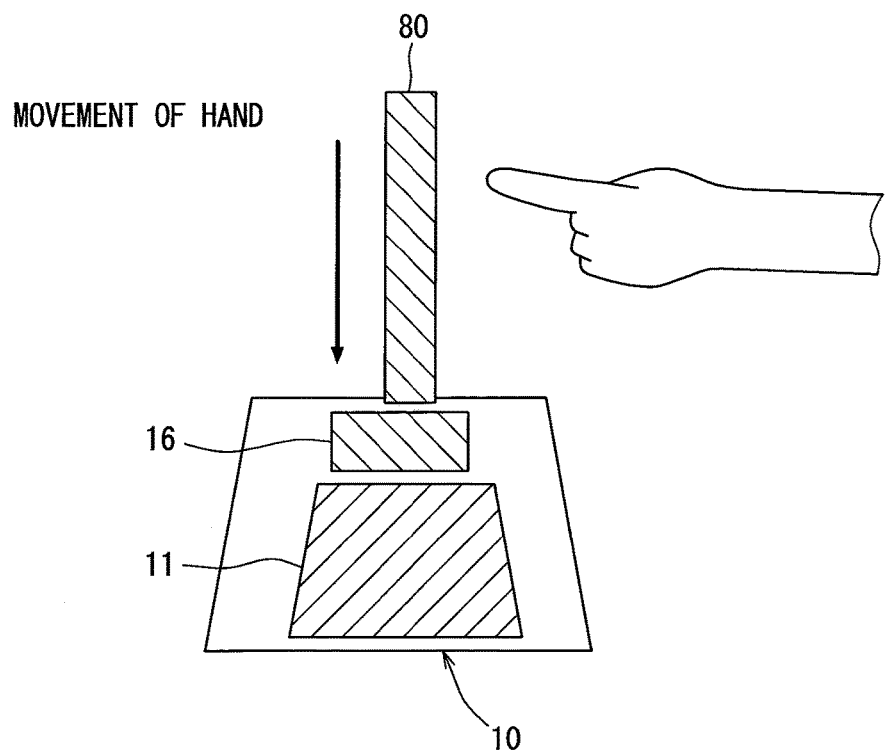
FIG. 10 is a diagram illustrating a relationship between an operation state and a threshold value of a maximum capacitance value, in the modification example of this disclosure.
FIG. 11 is a diagram illustrating a prohibition state and a prohibition state cancellation unit, in the first embodiment of this disclosure.

Meanwhile, Hth1 and Hth2 which are threshold values may be set to vary depending on the present operation state as illustrated in FIGS. 9 and 10.

Next, a relationship between a maximum capacitance value and position coordinates of a finger will be described.

Information regarding the position coordinates of the finger is an x coordinate which is a coordinate on the design panel 11 in the x-axis direction and a y coordinate which is a coordinate on the design panel in the y-axis direction. The remote operation device 10 switches a component to be subjected to an operation input and switches contents of the operation input for the component in accordance with an operation state of the operation control unit 13 and a combination of the x coordinate and the y coordinate which are detected by the operation control unit 13. At this time, the display system 20 switches the operation panel screen 213 and switches the operation input marker 21302.

Next, position coordinates will be described. The operation control unit 13 sets a position coordinate system for each of the above-mentioned x-axis and y-axis on the design panel 11 with any location on the design panel 11 as a reference point. The operation control unit 13 detects position coordinates of a maximum capacitance value acquired as position coordinates of a finger. The operation control unit 13 selects a component and performs an operation input for the selected component on the basis of the position coordinates of the finger. Specifically, the sliding of the finger is detected, and the selection icon 212 and the operation input marker 21302 are moved in a sliding direction. In addition, the selection icon 212 and the operation input marker 21302 may be set to be moved in accordance with the present position coordinates of the finger. At this time, the display system 20 switches the operation panel screen 213 and switches the operation input marker 21302.

In this embodiment, when an operation state is set to be in-proximity and the movement of a finger in an in-proximity region is detected, the remote operation device 10 switches a component to be selected. At this time, the display system 20 switches the operation panel screen 213. In addition, when the finger in the in-touch region is moved and a determination operation input is performed in an operation state set to be in-touch, the remote operation device 10 switches contents of an operation input for the selected component. At this time, the display system 20 switches the operation input marker 21302. In addition, when the finger is not positioned in either of the in-proximity region and the in-touch region, the remote operation device 10 does not perform an operation input for a component. At this time, the display system 20 does not switch a display screen.

Meanwhile, a method of switching a component and contents of an operation input for the component is not limited to such a configuration and can be appropriately modified. For example, a configuration may be adopted in which a component to be subjected to an operation input is switched by the movement of a finger in an in-touch region when an operation state is set to be in-touch.

Next, a prohibition state and a method of canceling the prohibition state in this embodiment will be described. In the prohibition state, the remote operation device 10 cannot perform an in-proximity operation.

When the remote operation device 10 is disposed on a vehicle, a finger may pass through an in-proximity region without user's intention depending on a location in which the remote operation device is disposed. Then, there is the possibility of the remote operation device 10 performing an operation input for a component against user's intention. In order to prevent this situation, the operation control unit 13 sets a prohibition state where an operation input is not performed on a component in spite of the detection of a finger in the in-proximity region when a specific operation is not performed. In addition, in the prohibition state, the display system 20 does not switch a display screen.

Meanwhile, a state where an operation input is not performed on a component even when the operation control unit 13 detects the position of a finger separated from the design panel 11 by a predetermined distance or more may be set as a prohibition state.

Next, a method of canceling a prohibition state will be described. FIG. 11 is an enlarged view of the remote operation device 10 for illustrating a method of canceling a prohibition state in this embodiment.

The guide unit 80 includes electrodes in a direction along the guide unit 80 and electrodes crossing the electrodes, and is provided with multiple crossing locations between the electrodes. Each of the electrodes is connected to the operation control unit 13. The operation control unit 13 measures the potential of each electrode, detects a capacitance value of each crossing location as a measurement value, and detects a crossing location in which a maximum capacitance value is set to thereby detect a location which a finger approaches.

The operation control unit 13 is ordinarily set to be in a prohibition state where an in-proximity operation is not received. When a finger traces the guide unit 80 by a fixed distance (in this embodiment, 10 cm) or more, the operation control unit 13 cancels the prohibition state. When a fixed period of time elapses after the finger is no longer positioned in either an in-touch region or an in-proximity region, a prohibition state is set again. In the prohibition state, the operation control unit 13 does not perform an operation input on a component even when a finger is moved in the in-proximity region as described above. For this reason, the possibility of the remote operation device 10 performing an operation input against user's intention is reduced.

Next, a series of flows in which a user performs an operation input on a component and switches the display system 20 using the remote operation device 10 will be described with reference to FIGS. 12 to 17.

Figure 12:
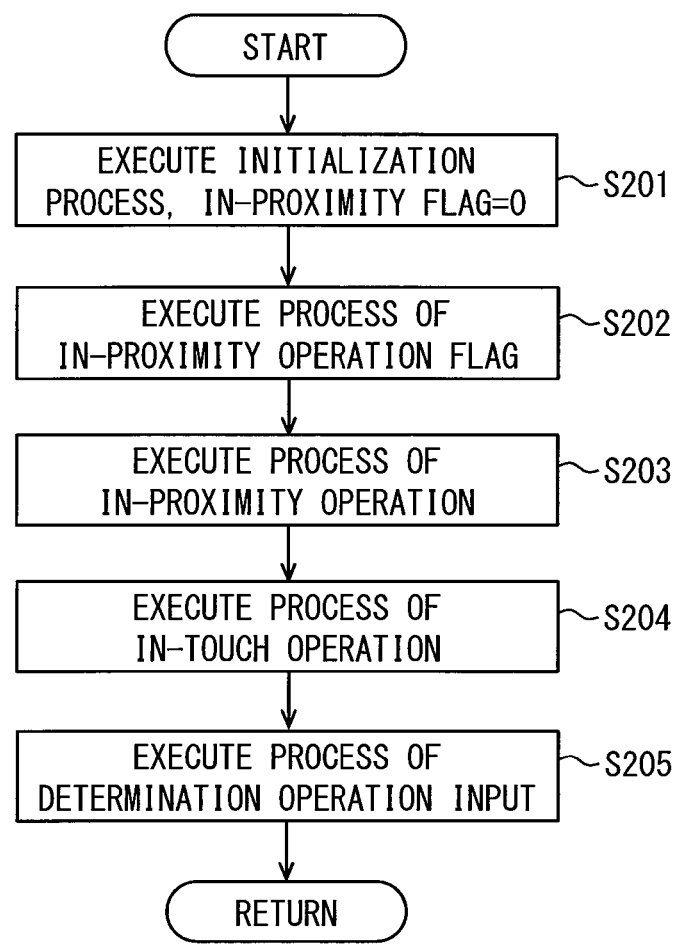
FIG. 12 is a flow chart illustrating switching between display screens of the display device using the input device, in the first embodiment of this disclosure.

FIG. 12 is a main routine. In S201, the operation control unit 13 performs an initialization process. In the initialization process, the operation control unit 13 sets an in-proximity flag stored in a RAM to 0. In S202, the operation control unit 13 performs a processing subroutine 1 (FIG. 15) for setting the in-proximity flag. In S203, the operation control unit 13 performs a processing subroutine 2 (FIG. 16) which is executed when an operation state is set to be in-proximity. In S204, the operation control unit 13 performs a processing subroutine 3 (FIG. 17) which is executed when an operation state is set to be in-touch. In S205, the operation control unit 13 performs a processing subroutine 4 (FIG. 18) of a determination operation input.

Figure 13:
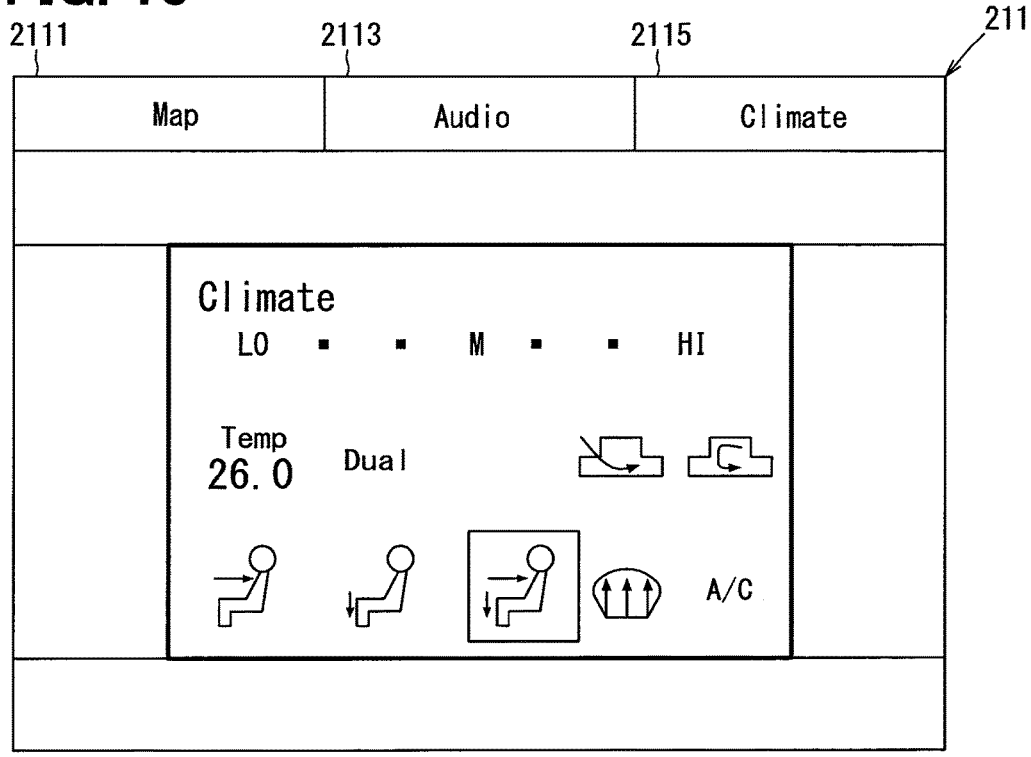
FIG. 13 is a diagram illustrating a display screen when a vehicle is traveling and an operation body is positioned in an in-proximity region, in the first embodiment of this disclosure.

FIG. 13 illustrates a display screen displayed on the display system 20 when a vehicle is traveling and an operation state is set to be in-proximity. At this time, the operation control unit 13 restricts an operation input for a specific component. In other words, the number of components capable of being selected is small during the traveling of the vehicle, compared to the switching screen illustrated in FIG. 5. A component for which an operation input is restricted is a component which is troublesome to a driver when the driver operates the component during the traveling of the vehicle. The display system 20 does not display the operation panel screen 213 of the component for which an operation is restricted. In addition, at this time, the display system 20 does not display the screen switching icon 211 of the restricted component. In this embodiment, the screen switching icon 211 displayed on the display system 20 includes three icons of the Map icon 2111, the Audio icon 2113, and the Climate icon 2115.

Figure 14:
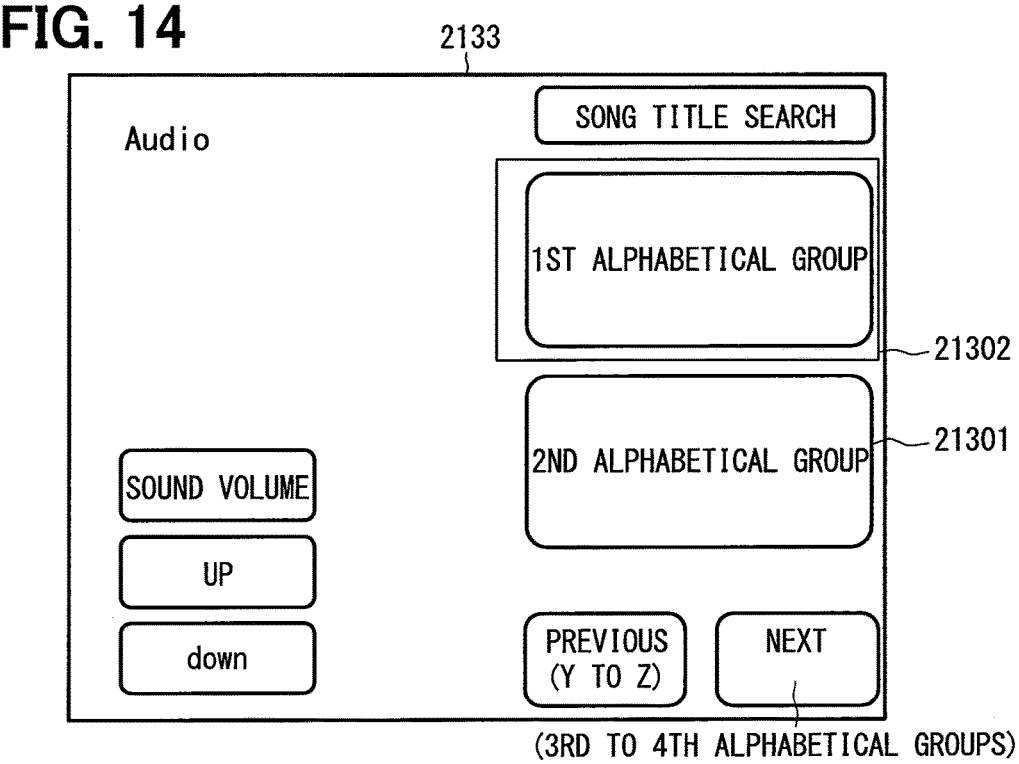
FIG. 14 is a diagram illustrating a display screen when a vehicle is traveling and an operation body is positioned in an in-touch region, in the first embodiment of this disclosure.

FIG. 14 illustrates a display screen displayed on the display system 20 when a vehicle is traveling and an operation state is set to be in-touch. The operation control unit 13 also simplifies an operation input for each component when a vehicle is traveling. As a simplification method, the size of the operation input icon 21301 may be made larger than that during the stop of the vehicle as illustrated in FIG. 14, or the specific operation input icon 21301 may not be displayed. For example, compared to the case of FIG. 6, icons of a first alphabetical group and a second alphabetical group, which are examples of the operation input icon 21301, in a song title search are large in size during the traveling of the vehicle. Therefore, a user can rapidly recognize the operation input icon 21301.

Figure 15:
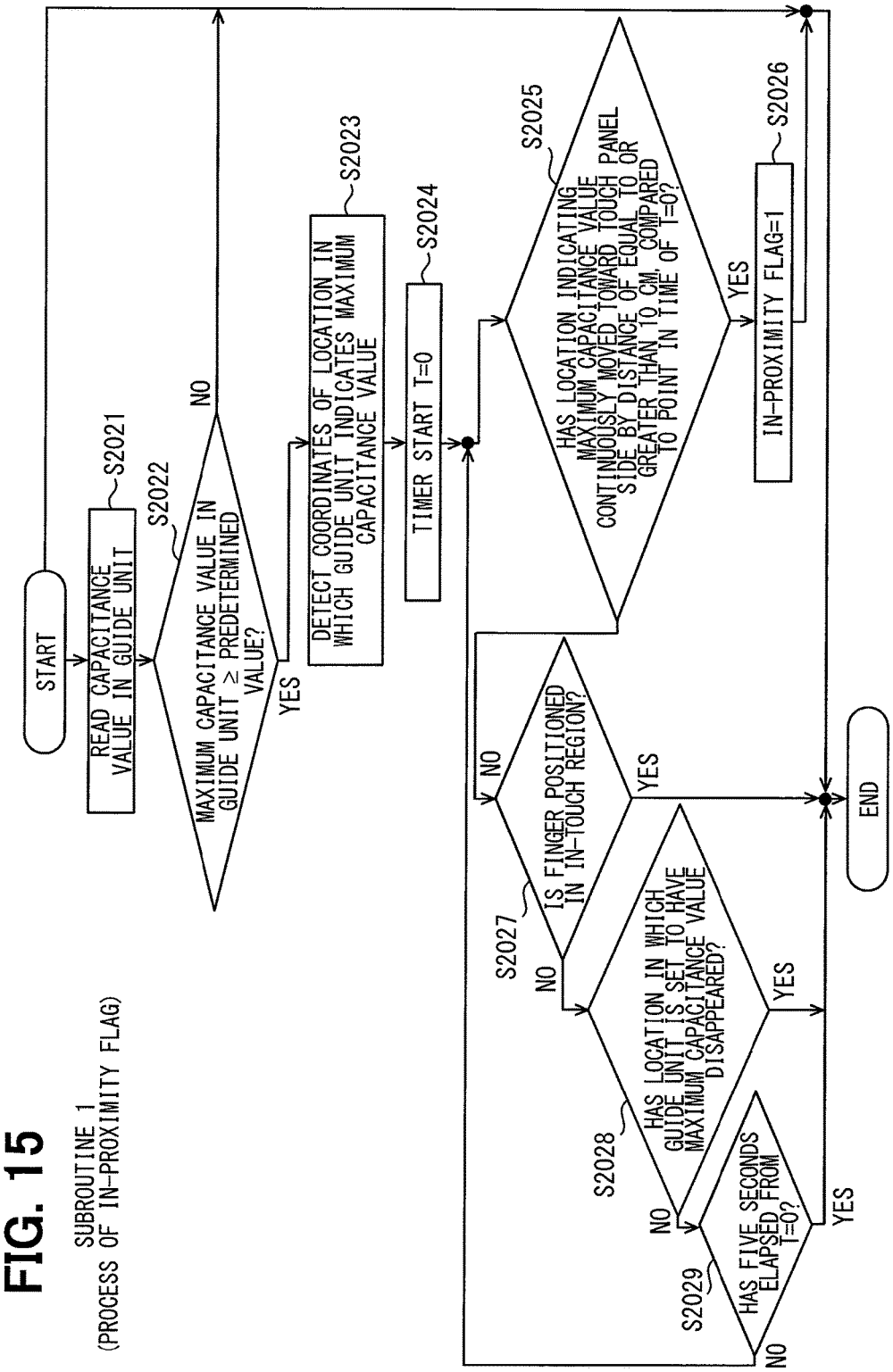
FIG. 15 is a flow chart illustrating a process for setting an operation state to be in-proximity, in the first embodiment of this disclosure.

Next, processing of an in-proximity flag will be described with reference to a flow chart of FIG. 15.

In S2021, the operation control unit 13 acquires a guide unit capacitance value which is a capacitance value in the guide unit 80, from the guide unit 80.

In S2022, the operation control unit 13 compares a guide unit maximum capacitance value among the acquired guide unit capacitance values with a predetermined value. The predetermined value is a capacitance value which is used in determination of whether a finger is approaching, and is stored in a RAM in advance. When the maximum capacitance value is equal to or greater than the predetermined value, the processing proceeds to S2023, and otherwise the subroutine 1 is terminated.

In S2023, the operation control unit 13 detects a location in which a guide unit maximum capacitance value is set, on the guide unit 80. At this time, the operation control unit 13 starts timer measurement in S2024 in which a location a indicating the guide unit maximum capacitance value is stored, and sets a variable t to 0.

In S2025, the operation control unit 13 measures a distance between the location a and a location b indicating a guide unit maximum capacitance value which is equal to or greater than the predetermined value at the current time. At this time, when the distance between the location a and the location b is equal to or greater than 10 cm, the processing proceeds to S2026, and otherwise proceeds to S2027. In other words, when the operation control unit 13 detects that a finger has moved on the guide unit 80 by a distance of equal to or greater than 10 cm, the processing proceeds to S2026. Meanwhile, the distance is not limited to 10 cm, and can be appropriately modified. In addition, the finger does not necessarily come into contact with the guide unit 80, and the movement of an approaching finger may be detected.

In S2026, the operation control unit 13 sets an in-proximity flag to 1, and terminates the subroutine 1.

In S2027, the operation control unit 13 detects whether a finger is positioned in an in-touch region. In other words, the operation control unit detects whether a sensor-side maximum capacitance value which is a maximum capacitance value in the touch sensor 12 which is acquired from the touch sensor 12 is equal to or greater than the threshold value Hth1 of FIG. 7. When the operation control unit 13 detects that the finger is positioned in the in-touch region, the subroutine 1 is terminated, and otherwise the processing proceeds to S2028.

In S2028, the operation control unit 13 detects the presence or absence of the location b in which a guide unit maximum capacitance value is set. When the location b in which a guide unit maximum capacitance value is set disappears, the subroutine 1 is terminated. Otherwise, the processing proceeds to S2029. If a finger separates once from the guide unit 80, a capacitance value of the guide unit 80 is set to be less than the predetermined value. In other words, the operation control unit 13 can detect whether the finger is moving along the guide unit 80.

In S2029, the operation control unit 13 detects whether five seconds has elapsed from t=0. In the case of over five seconds, the subroutine 1 is terminated, and otherwise the processing returns to S2025. When the finger has moved by a distance of equal to or greater than 10 cm within five seconds after approaching the guide unit 80, the operation control unit 13 sets the in-proximity flag to 1. In other words, a time during which the finger traces the guide unit 80 can be restricted.

Figure 16:
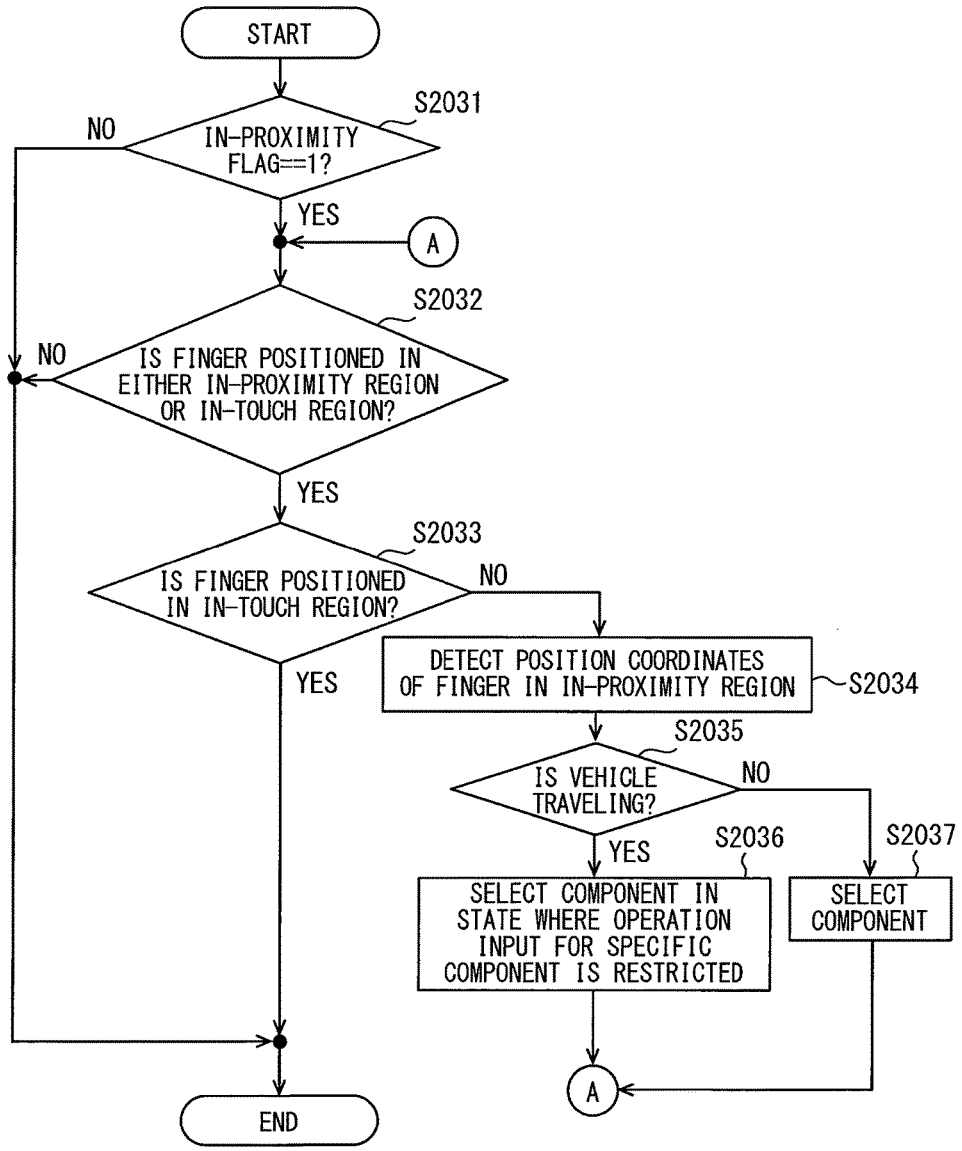
FIG. 16 is a flow chart illustrating an operation of the input device when an operation state is set to be in-proximity, in the first embodiment of this disclosure.

Next, contents of an operation input of the operation control unit 13 when an operation state is set to be in-proximity will be described with reference to FIG. 16.

In S2031, the operation control unit 13 detects whether an in-proximity flag is 1. When the in-proximity flag is 1, the processing proceeds to S2032, and otherwise the subroutine 2 is terminated.

In S2032, the operation control unit 13 detects whether a finger is positioned in either an in-proximity region or an in-touch region. In other words, the operation control unit 13 detects whether a sensor-side maximum capacitance value acquired from the touch sensor 12 is less than the threshold value Hth2 of FIG. 7. When the finger is positioned in the in-touch region or the in-proximity region, the processing proceeds to S2033, and otherwise the subroutine 2 is terminated.

In S2033, the operation control unit 13 detects whether the finger is positioned in the in-touch region. In other words, the operation control unit 13 detects whether the sensor-side maximum capacitance value is equal to or greater than the threshold value Hth1 of FIG. 7. When the operation control unit 13 detects that the finger is positioned in the in-touch region, the subroutine 3 is terminated, and otherwise the processing proceeds to S2034.

In S2034, the operation control unit 13 detects position coordinates of the sensor-side maximum capacitance value in the in-proximity region and detects position coordinates of the finger.

In S2035, the operation control unit 13 detects whether the vehicle is traveling. When the vehicle is traveling, the processing proceeds to S2036, and otherwise proceeds to S2037. In this embodiment, when a vehicle speed of the vehicle is 20 km/h, it is determined that the vehicle is traveling.

In S2036, the operation control unit 13 performs an input for selecting a component in a state where an operation input for a specific component is restricted. Thereafter, the processing returns to S2032.

In S2037, the operation control unit 13 performs an input for selecting a component. Thereafter, the processing returns to S2032.

Figure 17:
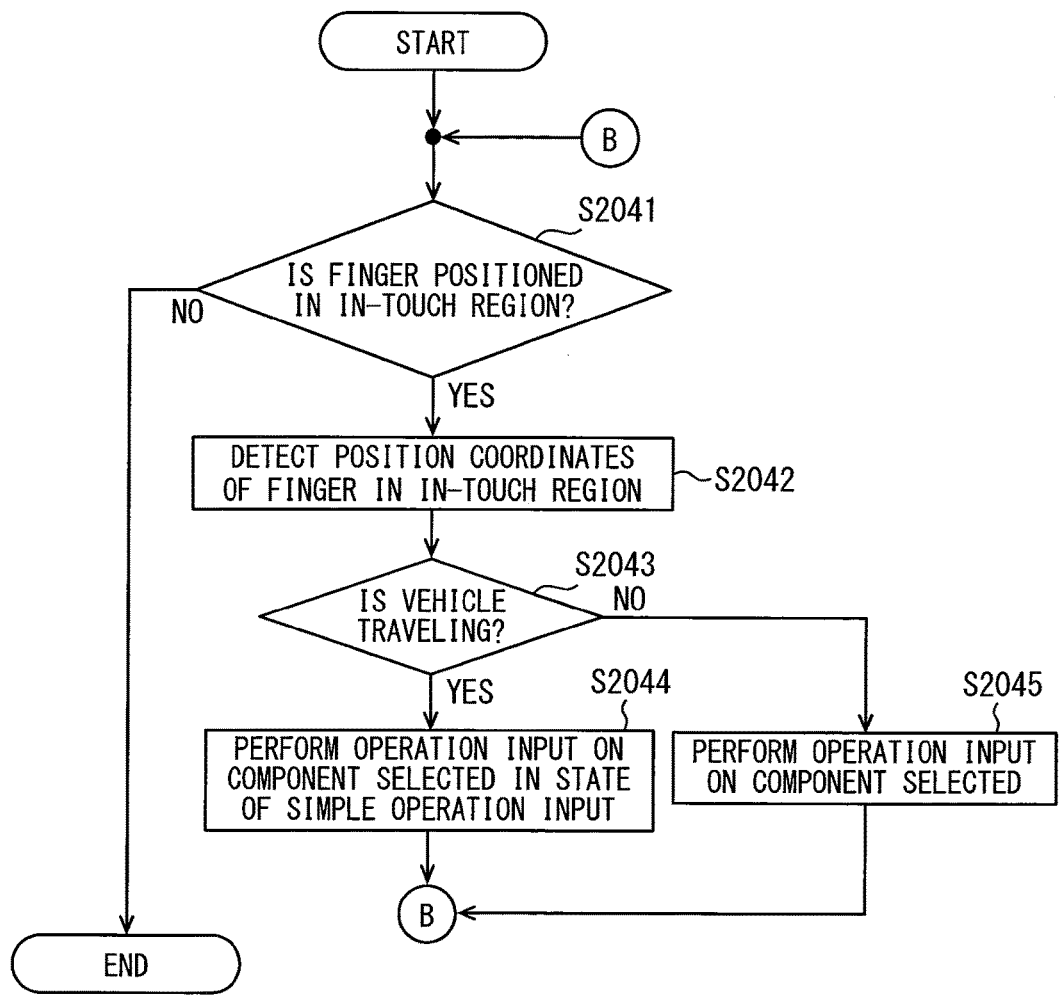
FIG. 17 is a flow chart illustrating an operation of the input device when an operation state is set to be in-touch, in the first embodiment of this disclosure.

Next, processing in which an operation state is set to be in-touch will be described with reference to a flow chart of FIG. 17.

In S2041, the operation control unit 13 detects whether a finger is positioned in an in-touch region. In other words, the operation control unit 13 detects whether the sensor-side maximum capacitance value is equal to or greater than the threshold value Hth1 of FIG. 7. When the finger is positioned in the in-touch region, the processing proceeds to S2042, and otherwise the subroutine 2 is terminated.

In S2042, the operation control unit 13 detects position coordinates of the sensor-side maximum capacitance value in the in-touch region and detects position coordinates of the finger.

In S2043, the operation control unit 13 detects whether the vehicle is traveling. When the vehicle is traveling, the processing proceeds to S2044, and otherwise proceeds to S2045.

In S2044, the operation control unit 13 performs an operation input on a component selected and the display system 20 in a state of the simple operation input of FIG. 14. Thereafter, the processing returns to S2041.

In S2045, the operation control unit 13 performs an operation input on a component selected and the display system 20. Thereafter, the processing returns to S2041.

Figure 18:
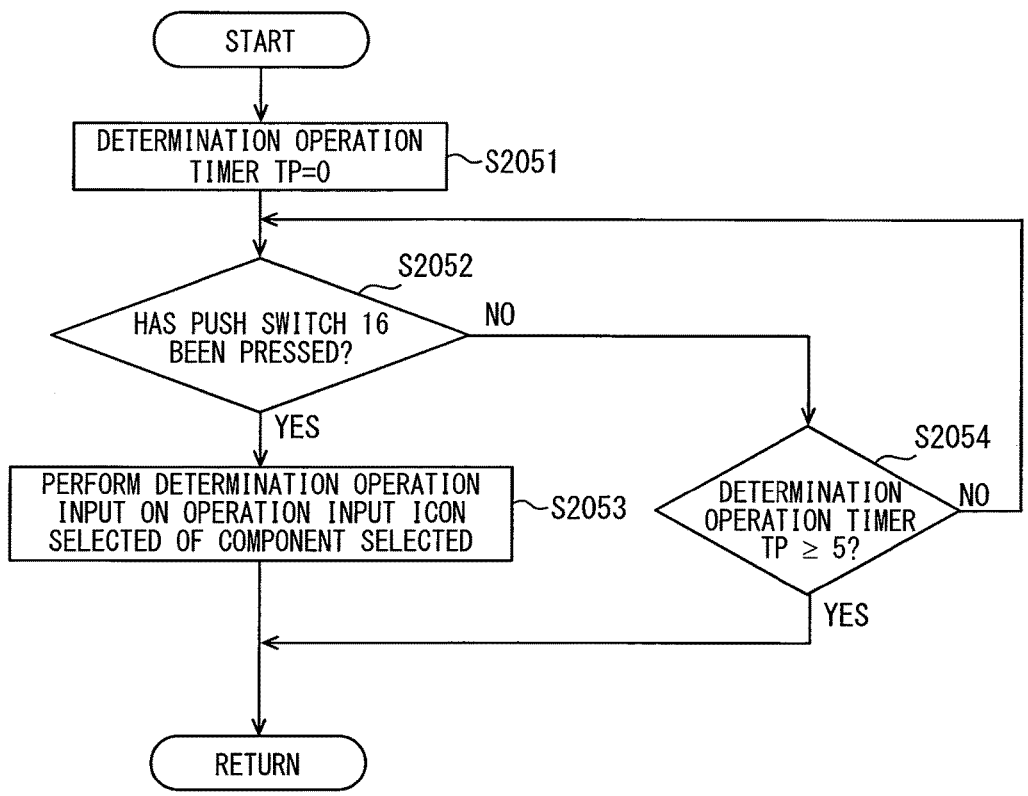
FIG. 18 is a flow chart illustrating a determination operation input, in the first embodiment of this disclosure.

Next, a determination operation input of the operation control unit 13 will be described with reference to FIG. 18.

In S2051, the operation control unit 13 sets a determination operation timer tp to 0. Therefore, the processing proceeds to S2052.

In S2052, the operation control unit 13 detects whether the push switch 16 has been pressed. When the push switch 16 has been pressed, the processing proceeds to S2053, and otherwise proceeds to S2054.

In S2053, the operation control unit 13 performs a determination operation input on a component selected and the display system. Thereafter, the subroutine 4 is terminated.

In S2054, the operation control unit 13 detects whether the determination operation timer tp is equal to or greater than 5. In other words, the operation control unit 13 detects whether five seconds has elapsed since the finger is detected not to be positioned in both of the in-proximity region and the in-touch region. When the determination operation timer tp is equal to or greater than 5, the subroutine 4 is terminated, and otherwise the processing returns to S2052.

Second Embodiment

Next, a second embodiment will be described with reference to FIGS. 19 to 25.

Figure 19:
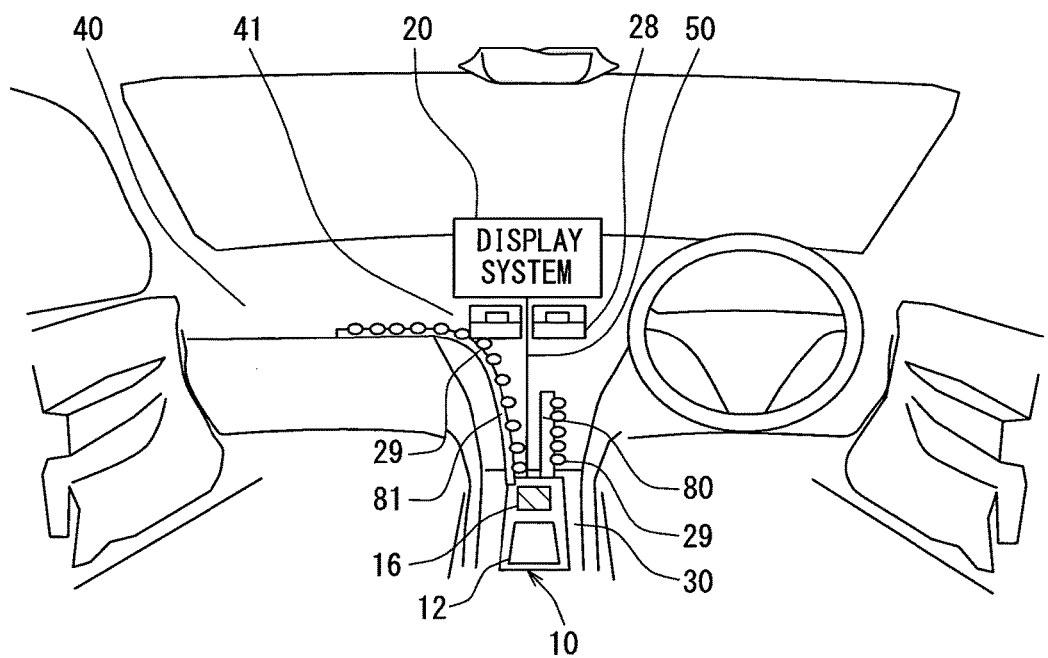
FIG. 19 is a diagram illustrating a prohibition state and a prohibition state cancellation unit, in a second embodiment of this disclosure.

FIG. 19 illustrates a state of the inside of a vehicle interior including a remote operation device 10 in the second embodiment. In the remote operation device 10, a passenger's seat side guide unit 81 having an extending tip end is further provided on a passenger's seat side along a center console 40 in the vehicle interior, separately from a guide unit 80 provided on a driver's seat side. In addition, the passenger's seat side guide unit 81 is provided at a position which is not capable of being traced by a driver's finger. In addition, the passenger's seat side guide unit 81 is provided at a position which is capable of being traced by a finger of an assistant who is an occupant on the passenger's seat. For this reason, when a guide unit maximum capacitance value acquired from the passenger's seat side guide unit 81 is moved by a fixed distance or more, the operation control unit 13 detects that the assistant intends to operate the remote operation device 10. In addition, when a prohibition state is canceled by the passenger's seat side guide unit 81 even when the vehicle is traveling, an operation input for a specific component is not restricted. In addition, the remote operation device 10 can be operated without allowing a simple input state to be set.

Figure 20:
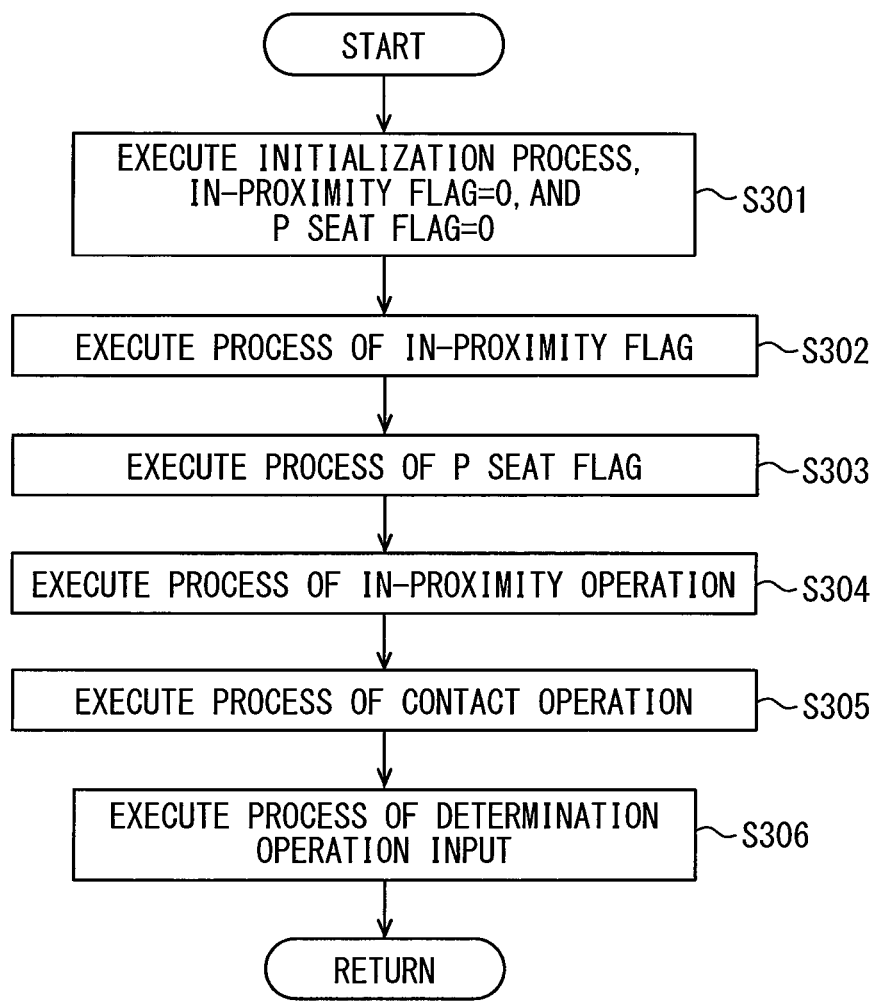
FIG. 20 is a flow chart illustrating a series of flows regarding switching between display screens of a display device using an input device, in the second embodiment of this disclosure.

FIG. 20 is a main routine in the second embodiment. In S301, the operation control unit 13 performs an initialization process. In the initialization process, the operation control unit 13 sets an in-proximity flag stored in a RAM to 0. In addition, the operation control unit 13 sets a P seat flag for detecting whether an assistant intends to operate the remote operation device 10 to 0. In S302, the operation control unit 13 performs a processing subroutine 1 (FIG. 21) for setting an in-proximity flag. In S303, the operation control unit 13 performs a subroutine 2 (FIG. 22) which is a process of setting a P seat flag. In S304, the operation control unit 13 performs a processing subroutine 3 (FIG. 23) which is executed when an operation state is set to be in-proximity. In S305, the operation control unit 13 performs a processing subroutine 4 (FIG. 24) which is executed when an operation state is set to be in-touch. In S306, the operation control unit 13 performs a processing subroutine 5 (FIG. 25) of a determination operation input.

Figure 21:
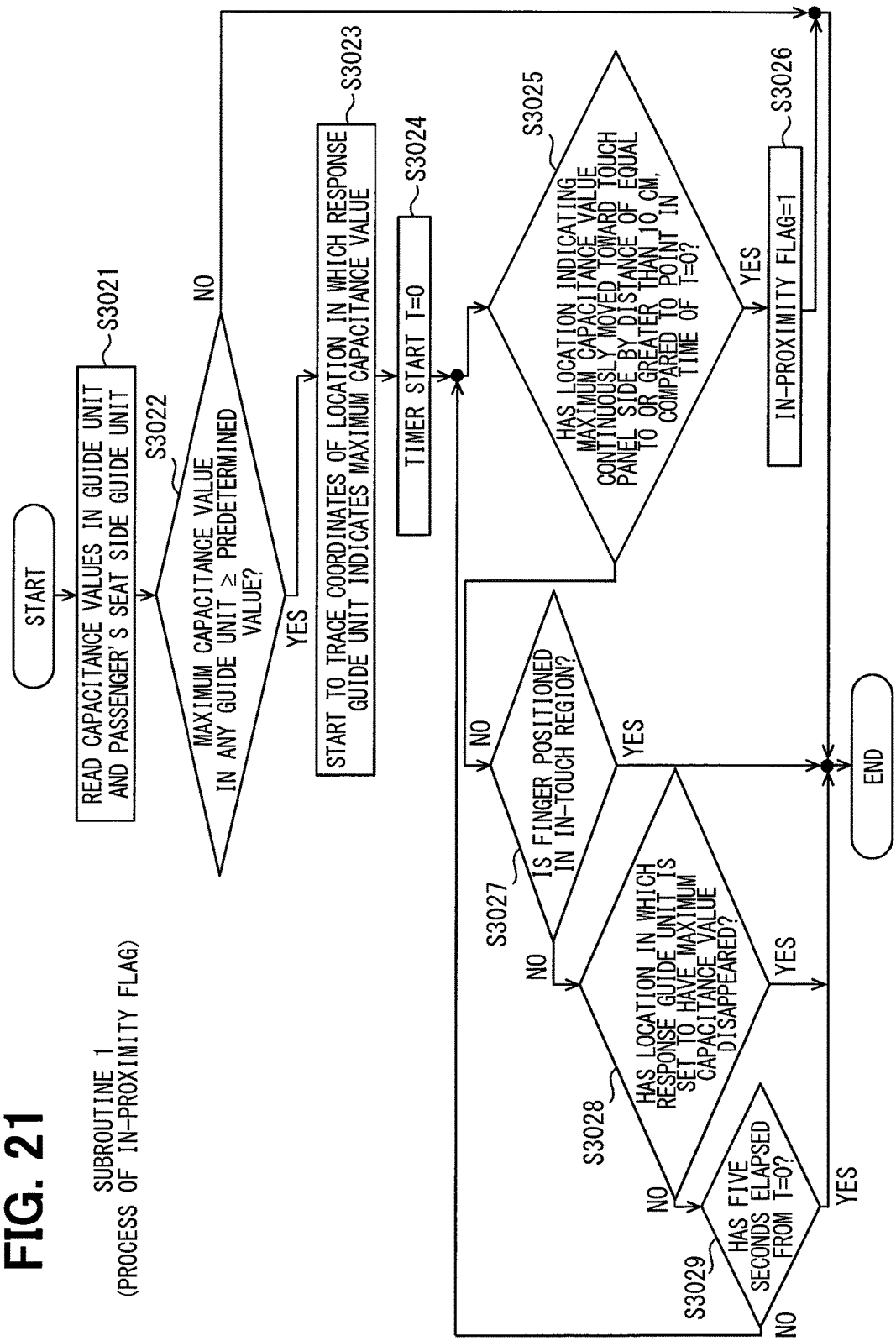
FIG. 21 is a flow chart illustrating a process for setting an operation state to be in-proximity, in the second embodiment of this disclosure.

Processing of an in-proximity flag will be described below with reference to a flow chart of FIG. 21.

In S3021, the operation control unit 13 acquires capacitance values of the guide unit 80 and the passenger's seat side guide unit 81. The processing proceeds to S3022.

In S3022, the operation control unit 13 compares maximum capacitance values of the respective capacitance values acquired from the guide unit 80 and the passenger's seat side guide unit 81 with a predetermined value. The predetermined value is a capacitance value for determining whether a finger has approached, and is stored in a RAM in advance. When any one of the acquired maximum capacitance values is equal to or greater than the predetermined value, the processing proceeds to S3023, and otherwise the subroutine 1 is terminated. Here, a guide unit that has acquired a guide unit maximum capacitance value out of the passenger's seat side guide unit 81 and the guide unit 80 will be referred to as a response guide unit.

In S3023, the operation control unit 13 detects a location in which a guide unit maximum capacitance value is set, on the response guide unit. At this time, the operation control unit 13 stores a location a indicating a guide unit maximum capacitance value.

In S3024, the operation control unit 13 starts timer measurement, and set a variable t to 0.

In S3025, the operation control unit 13 measures a distance between the location a and a location b indicating a guide unit maximum capacitance value which is equal to or greater than the predetermined value at the current time. At this time, when the distance between the location a and the location b is equal to or greater than 10 cm, the processing proceeds to S3026, and otherwise proceeds to S3027. In other words, when a finger is moved on the response guide unit by a distance of equal to or greater than 10 cm, the processing proceeds to S3026. Meanwhile, the value of the distance is not limited to 10 cm, and can be appropriately modified.

In S3026, the operation control unit 13 sets an in-proximity flag to 1, and terminates the subroutine 1.

In S3027, the operation control unit 13 detects whether a finger is positioned in an in-touch region. In other words, the operation control unit 13 detects whether a maximum capacitance value is equal to or greater than the threshold value Hth1 of FIG. 7. When the operation control unit 13 detects that the finger is positioned in the in-touch region, the operation control unit terminates the subroutine 1, and otherwise the processing proceeds to S3028.

In S3028, the operation control unit 13 detects the presence or absence of the location b in which a guide unit maximum capacitance value is set to be equal to or greater than the predetermined value. When the location b in which a guide unit maximum capacitance value is set to be equal to or greater than the predetermined value disappears, the operation control unit 13 terminates the subroutine 1. Otherwise, the processing proceeds to S3029. When a finger once separates from the response guide unit, a capacitance value on the response guide unit is set to be less than the predetermined value. In other words, the operation control unit 13 can detect whether the finger is moving along the response guide unit.

In S3029, the operation control unit 13 detects whether five seconds has elapsed from t=0. In the case of over five seconds, the subroutine 1 is terminated, and otherwise the processing returns to S3025. When the finger has moved by a distance of equal to or greater than 10 cm within five seconds after approaching the response guide unit, the operation control unit 13 sets the in-proximity flag to 1. In other words, a time during which the finger traces the response guide unit can be restricted.

Figure 22:
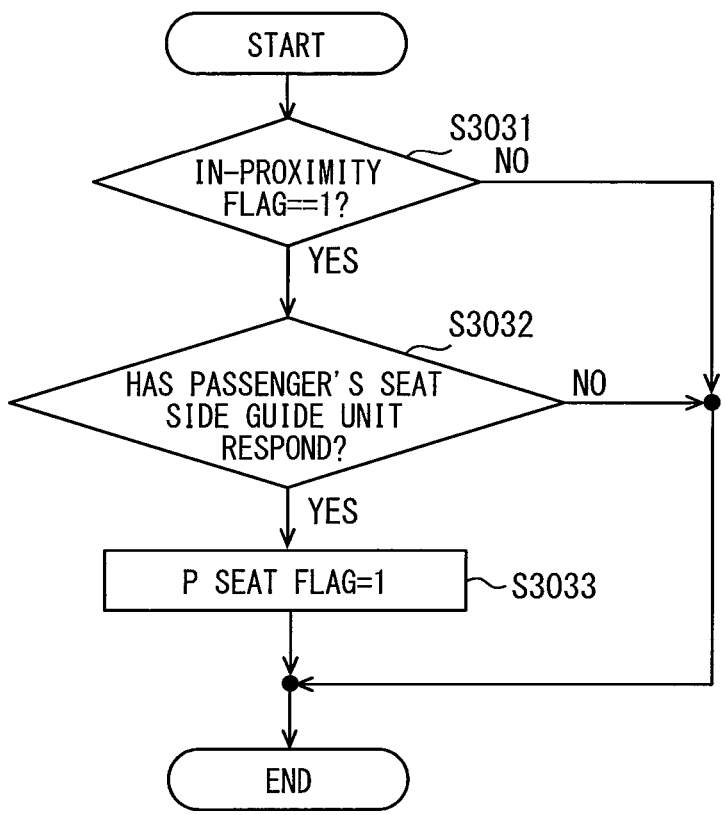
FIG. 22 is a flow chart illustrating a process of determining an occupant who operates the input device, in the second embodiment of this disclosure.

Next, the subroutine 2 for setting a P seat flag will be described with reference to FIG. 22.

In S3031, the operation control unit 13 detects whether an in-proximity flag is 1. When the in-proximity flag is 1, the processing proceeds to S3032, and otherwise the subroutine 2 is terminated.

In S3032, the operation control unit 13 detects from which one of the guide unit 80 and the passenger's seat side guide unit 81 a guide unit maximum capacitance value has been acquired. When the guide unit maximum capacitance value is acquired from the passenger's seat side guide unit 81, the processing proceeds to S3033, and otherwise the subroutine 2 is terminated. In other words, the operation control unit 13 detects which one out of a driver and an occupant on the passenger's seat intends to operate the remote operation device 10.

In S3033, the operation control unit 13 sets a P seat flag to 1. In addition, the subroutine 2 is terminated.

Figure 23:
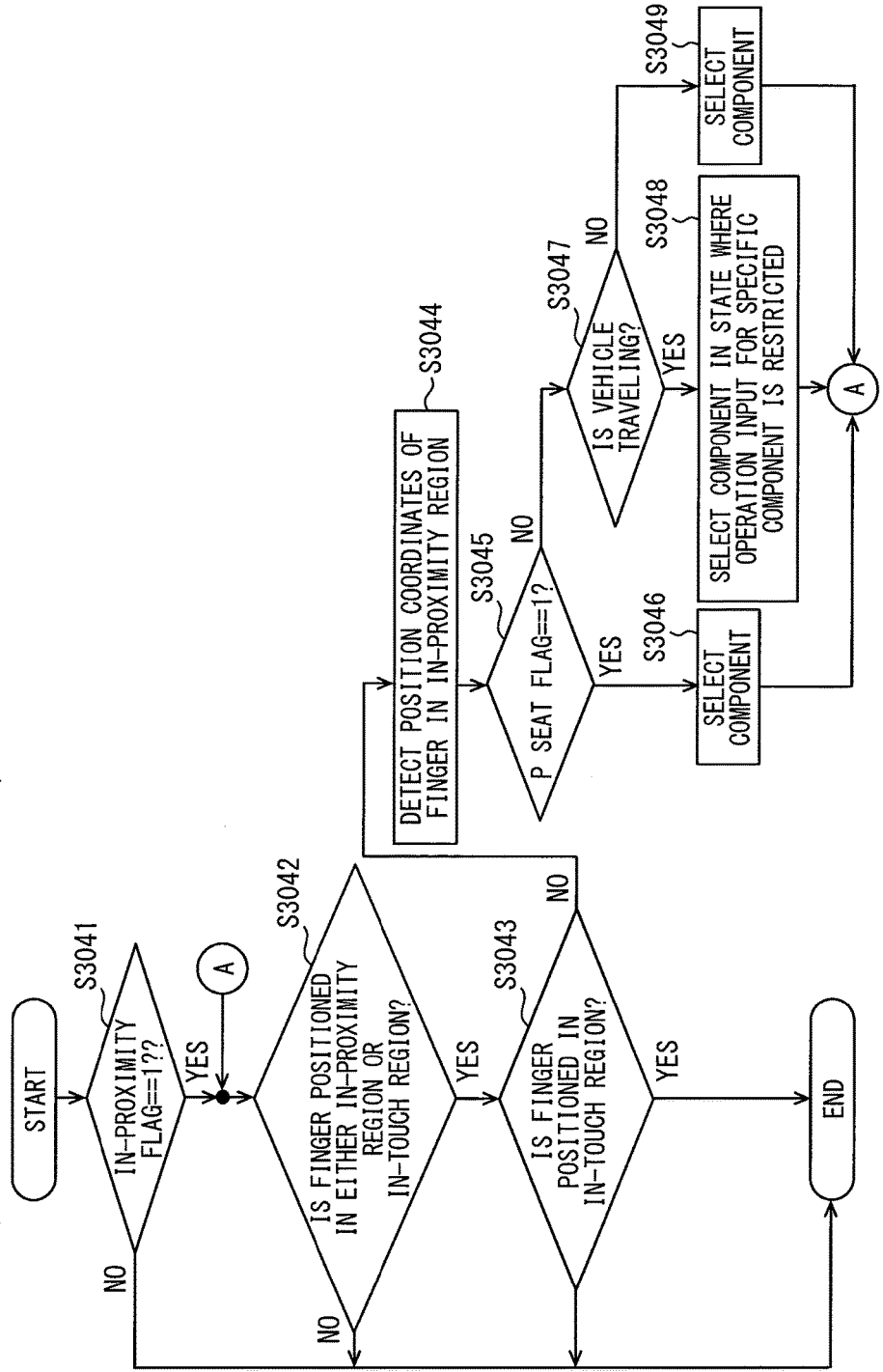
FIG. 23 is a diagram illustrating a relationship between an operating occupant and an operation input of the input device when a vehicle is traveling and an operation body is positioned in an in-proximity region, in the second embodiment of this disclosure.

Next, contents of an operation input of the operation control unit 13 when an operation state is set to be in-proximity will be described with reference to FIG. 23.

In S3041, the operation control unit 13 detects whether an in-proximity flag is 1. When the in-proximity flag is 1, the processing proceeds to S3042, and otherwise the subroutine 2 is terminated.

In S3042, the operation control unit 13 detects whether a finger is positioned in either an in-proximity region or an in-touch region. In other words, the operation control unit 13 detects whether a sensor-side maximum capacitance value is less than the threshold value Hth2 of FIG. 7. When the operation control unit 13 detects that the finger is positioned in either of the in-touch region and the in-proximity region, the processing proceeds to S3043, and otherwise the subroutine 3 is terminated.

In S3043, the operation control unit 13 detects whether the finger is positioned in the in-touch region. In other words, the operation control unit 13 detects whether the sensor-side maximum capacitance value is equal to or greater than the threshold value Hth1 of FIG. 7. When the finger is positioned in the in-touch region, the subroutine 3 is terminated, and otherwise the processing proceeds to S3044.

In S3044, the operation control unit 13 detects position coordinates of the sensor-side maximum capacitance value in the in-proximity region and detects position coordinates of the finger in the in-proximity region. Thereafter, the processing proceeds to S3045.

In S3045, the operation control unit 13 detects whether a P seat flag is 1. When the P seat flag is 1, the processing proceeds to S3046, and otherwise proceeds to S3047.

In S3046, the operation control unit 13 selects a component on the basis of the position coordinates of the finger. Thereafter, the processing returns to S3042.

In S3047, the operation control unit 13 detects whether the vehicle is traveling. When the vehicle is traveling, the processing proceeds to S3048, and otherwise proceeds to S3049.

In S3048, the operation control unit 13 selects a component on the basis of the position coordinates of the finger in a state where an input for selecting a specific component is restricted. Thereafter, the processing returns to S3042.

In S3049, the operation control unit 13 performs an input for selecting a component on the basis of the position coordinates of the finger. Thereafter, the processing returns to S3042.

Figure 24:
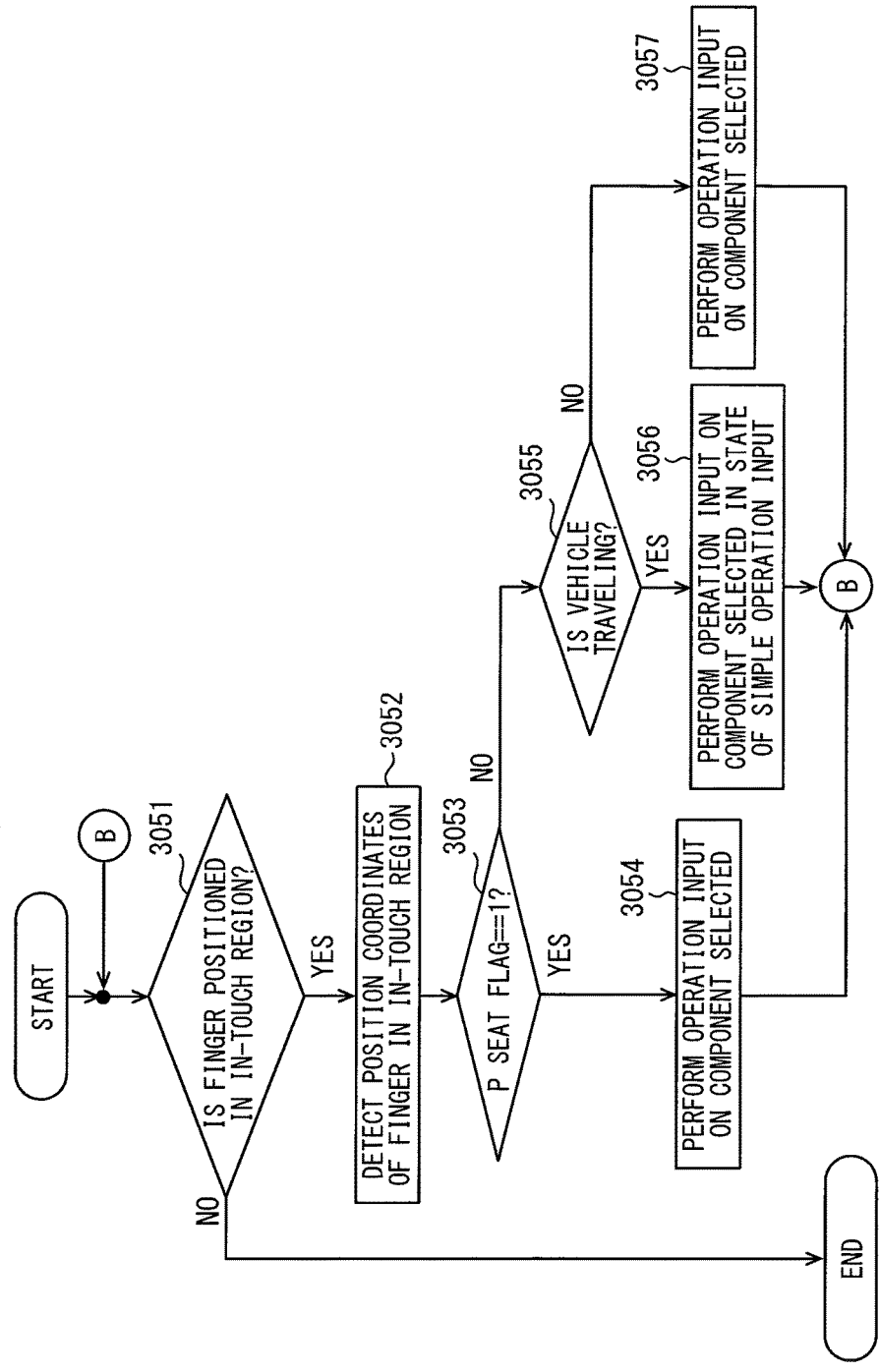
FIG. 24 is a diagram illustrating a relationship between an operating occupant and an operation input of the input device when a vehicle is traveling and an operation body is positioned in an in-touch region, in the second embodiment of this disclosure.

Next, processing in which an operation state is set to be in-touch will be described with reference to a flow chart of FIG. 24.

In S3051, the operation control unit 13 detects whether a finger is positioned in an in-touch region. In other words, the operation control unit 13 detects whether the sensor-side maximum capacitance value is equal to or greater than the threshold value Hth1 of FIG. 7. When the finger is positioned in the in-touch region, the processing proceeds to S3052, and otherwise the subroutine 2 is terminated.

In S3052, the operation control unit 13 detects position coordinates of the sensor-side maximum capacitance value in the in-touch region and detects position coordinates of the finger.

In S3053, the operation control unit 13 detects whether a P seat flag is 1. When the P seat flag is 1, the processing proceeds to S3054, and otherwise proceeds to S3055.

In S3054, the operation control unit 13 performs an operation input on a component selected and the display system 20. Thereafter, the processing returns to S3051.

In S3055, the operation control unit 13 detects whether the vehicle is traveling. When the vehicle is traveling, the processing proceeds to S3056, and otherwise proceeds to S3057.

In S3056, the operation control unit 13 performs an operation input on a component selected and the display system 20 in a state of a simple operation input. Thereafter, the processing returns to S3051.

In S3057, the operation control unit 13 performs an operation input on a component selected and the display system 20. Specifically, an operation input icon is selected using the method as illustrated in the operation screen of FIG. 14. Thereafter, the processing returns to S3051.

Figure 25:
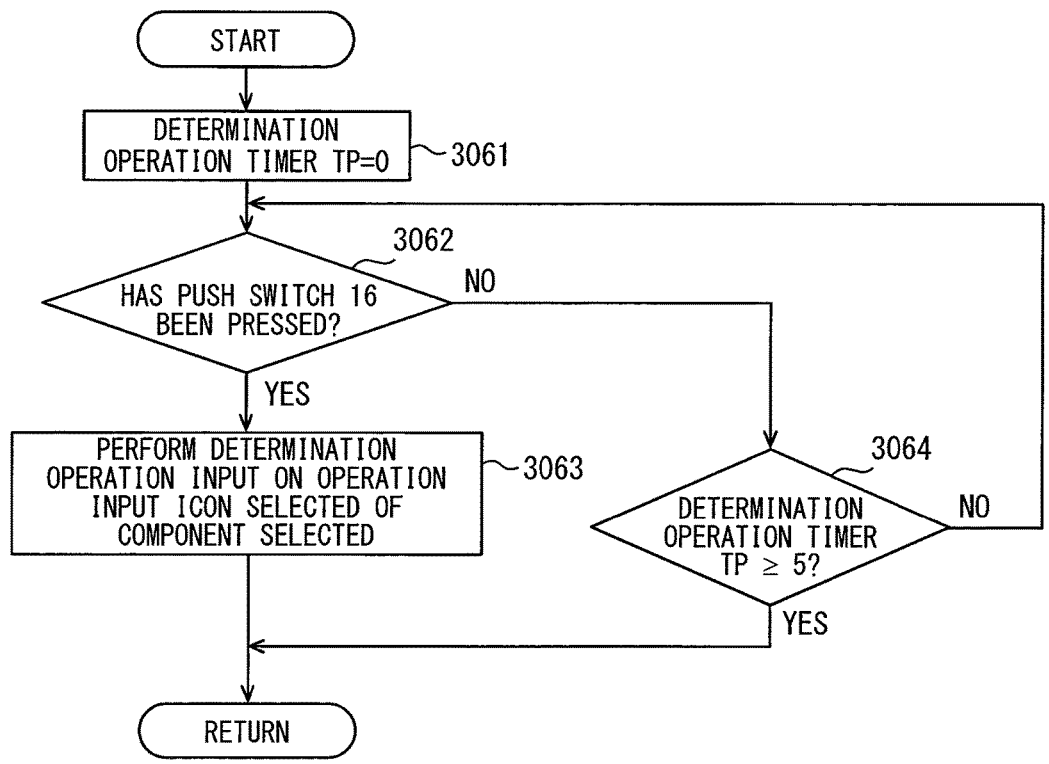
FIG. 25 is a flow chart illustrating a determination operation input, in the second embodiment of this disclosure.

Next, a determination operation input of the operation control unit 13 will be described with reference to FIG. 25.

In S3061, the operation control unit 13 sets a determination operation timer tp to 0. Thereafter, the processing proceeds to S3062.

In S3062, the operation control unit 13 detects whether a push switch 16 is pressed. When the push switch 16 is pressed, the processing proceeds to S3063, and otherwise proceeds to S3064.

In S3063, the operation control unit 13 performs a determination operation input of an operation input icon selected on a component selected and the display system. Thereafter, the subroutine 4 is terminated.

In S3064, the operation control unit 13 detects whether the determination operation timer tp is equal to or greater than 5. In other words, the operation control unit 13 detects whether five seconds has elapsed since the finger is detected not to be positioned in both of the in-proximity region and the in-touch region. When the determination operation timer tp is equal to or greater than 5, the subroutine 4 is terminated, and otherwise the processing returns to S3062.

Meanwhile, in the first embodiment and the second embodiment, a display device is assumed to be the display system 20. However, this disclosure is not limited to such a configuration, and can be appropriately modified as long as a display device, such as a head up display, has a display function.

In addition, an operation body is assumed to be a finger, but may be a touch pen, a palm, or the like.

In addition, in the first embodiment and the second embodiment, a first measurement value and a second measurement value are assumed to be a maximum capacitance value, but can be appropriately modified as long as a measurement value varies depending on a distance between an operation body and an operation surface.

In addition, a first operation region is assumed to be an in-touch region, a second operation region is assumed to be an in-proximity region, and the number of operation regions is assumed to be two. However, a threshold value may be increased, and an operation region may further be provided.

Figure 26:
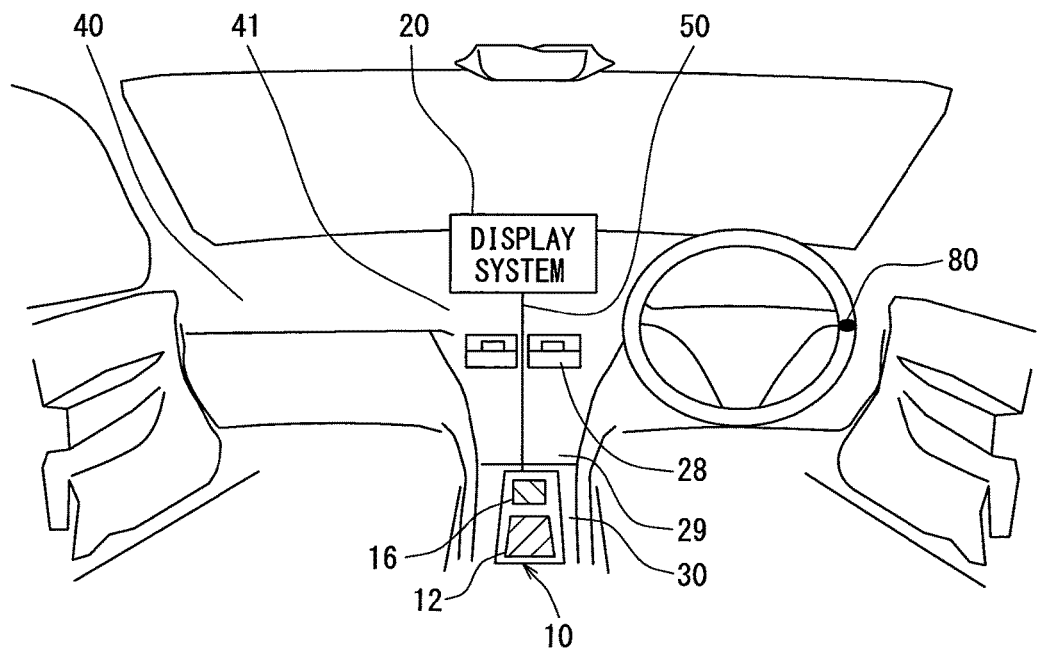
FIG. 26 illustrates an example of a case where a switching operation unit is configured as a switch, which is a type of a modification example of this disclosure.

In addition, a switching operation unit is assumed to be the guide unit 80 connected to the remote operation device 10, and a prohibition state cancellation signal is assumed to be a maximum capacitance value. However, the switching operation unit and the prohibition state cancellation signal can be appropriately modified as long as the units are provided in a region separated from an in-proximity region and have a function of transmitting a signal. For example, as illustrated in FIG. 26, when the switching switch 80 is provided on the right side of a handle, a prohibition state is canceled while a driver is touching the switching switch 80.

Meanwhile, when a user traces the guide unit 80, a sound may be made as the user makes a tracing.

In addition, in the above-mentioned method, when the movement of a finger along the guide unit 80 and the passenger's seat side guide unit 81 is detected, a prohibition state is canceled. However, only when the movement of a finger approaching the touch sensor 12 is detected in the guide unit 80 and the passenger's seat side guide unit 81, a prohibition state may be canceled.

In addition, a main routine may be terminated when the operation of the remote operation device 10 is not performed for a fixed period of time, instead of being terminated after a determination operation input. Otherwise, the processing may be returned to a process of an in-proximity operation. In this manner, the remote operation device 10 capable of alternately performing an in-proximity operation, an in-touch operation, and a determination operation input can be configured.

In addition, a display device is assumed to be the display system 20, but can be appropriately modified as long as a display device, such as a head up display, has a display function.

Meanwhile, the above-mentioned input device can perform not only an input for a component and a display device but also an input for operating other devices.

The above-mentioned disclosure includes the following aspects.

According to a first aspect of the present disclosure, an input device mounted on a vehicle with a display device, includes: an operation surface, on which an operation body performs an input for switching a display screen of the display device; a distance acquisition unit that acquires a measurement value, which varies according to a distance between the operation surface and the operation body; an operation region setting unit that sets a first operation region, in which the distance between the operation surface and the operation body is less than a threshold value, and a second operation region, in which the distance between the operation surface and the operation body is equal to or greater than the threshold value; a display screen switching unit that detects a movement of the operation body in the first operation region or the second operation region as a moving operation, and switches the display screen; a prohibition state setting unit that sets a prohibition state that the display screen is not switched by the moving operation in the second operation region; a signal determination unit that receives a predetermined signal from a switching operation unit arranged at a position separated from an area above the operation surface, and determines whether the signal is a prohibition state cancellation signal for canceling the prohibition state; and a prohibition state cancellation unit that cancels the prohibition state when the signal determination unit determines that the signal is the prohibition state cancellation signal.

In the above-mentioned input device, even when the operation body is moved in the second operation region in the case of the prohibition state, the display screen of the display device is not switched. Even when a user erroneously moves the operation body in the second operation region, the display screen of the display device is not switched.

In addition, when a user intentionally operates the switching operation unit to cancel the prohibition state, the display screen of the display device can be switched by the movement of the operation body in the second operation region. Therefore, the possibility of the user erroneously performing an aerial operation can be reduced.

Alternatively, the switching operation unit may be a guide unit, which has a predetermined length, and is arranged at a position separated from the operation surface by a predetermined distance along a direction toward the operation surface. The prohibition state cancellation signal is generated based on the movement of the operation body along the guide unit. In this manner, a user moves the operation body toward the operation surface from a position separated from the operation surface by a predetermined distance, and the display screen can be switched as it is by the moving operation of the operation body in the second operation region, and thus the complexity of an operation of canceling a prohibition state can be reduced.

Alternatively, the signal determination unit may distinctively detect a driver side signal received from a driver seat side switching operation unit, which is arranged on a driver side of a center console panel of the vehicle, and a passenger seat side signal received from a passenger seat side switching operation unit, which is arranged on a passenger seat side of the center console panel and is different from the driver seat side switching operation unit. When the prohibition state cancellation unit cancels the prohibition state according to a result that the signal determination unit detects the driver side signal, the display screen switching unit does not permit a specific switching operation among a plurality of switching operations on the display screen while the vehicle is moving. When the prohibition state cancellation unit cancels the prohibition state according to a result that the signal determination unit detects the passenger seat side signal, the display screen switching unit permits the specific switching operation among the plurality of switching operations on the display screen. In this manner, a driver can be made to concentrate on a driving operation by restricting a driver's specific switching during the traveling of the vehicle. On the other hand, when an occupant on the passenger's seat side operates the input device, a specific switching is not required to be restricted, and thus it is preferable to permit the above-mentioned specific switching.

Alternatively, the display screen switching unit may set a switching operation mode of the display screen due to the movement of the operation body to be different between a case where the operation body is positioned within the first operation region and a case where the operation body is positioned within the second operation region. In this manner, a switching mode of the display device is made different according to in which region out of the first operation region and the second operation region the operation body is positioned, and thus a user can know in which region out of the first operation region and the second operation region the operation body operated by the user himself or herself is positioned at present.

Alternatively, the operation region setting unit may set the threshold value to be variable, and sets the threshold value to be different between a case where the operation body is positioned within the first operation region and a case where the operation body is positioned only within the second operation region. In this manner, the possibility that an operation region having the operation body positioned therein is frequently switched can be reduced.

Alternatively, the prohibition state setting unit may reset the prohibition state when a predetermined period of time elapses after the moving operation in the first operation region and the second operation region is terminated. In this manner, in the input device, a prohibition state is reset when a predetermined period of time elapses without user's intention. For this reason, the user does not personally need to set a prohibition state whenever the user terminates an operation input, and thus unintentional switching of the display screen which is caused by user's forgetfulness of the setting of a prohibition state can be further reduced.

Alternatively, the guide unit may include a light emitting unit. In this manner, the light emitting unit can be made to emit light when the operation body moves along the guide unit.

According to a second aspect of the present disclosure, an input device mounted on a vehicle with a display device, includes: an operation surface, on which an operation body performs an input; a distance acquisition unit that acquires a distance between the operation surface and the operation body; a display control unit that detects a movement of the operation body on the operation surface, and switches the display screen; a guide unit that is arranged at a position separated from the operation surface by a predetermined distance along a direction toward the operation surface, and has a predetermined length; a mode switching operation detection unit that detects the movement of the operation body along the guide unit; and a mode switching unit that switches between an aerial operation prohibition mode for reflecting only the movement of the operation body, in which a distance between the operation surface and the operation body is within a predetermined distance, on a switching operation of the display screen, and an aerial operation permission mode for additionally reflecting an operation of the moving body, in which the distance between the operation surface and the operation body exceeds the predetermined distance, on the switching operation of the display screen. The mode switching unit switches the aerial operation prohibition mode to the aerial operation permission mode when the mode switching operation detection unit detects that the operation body moves along the guide unit.

In the above-mentioned input device, a user can freely switch between the aerial operation prohibition mode and the aerial operation permissible mode, and the switching of the display screen which is different from the user's intention can be reduced.

It is noted that a flowchart or the processing of the flowchart in the present application includes sections (also referred to as steps), each of which is represented, for instance, as S201. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An input device mounted on a vehicle with a display device, the input device comprising:
   an operation surface, on which an operation body performs an input;
   a distance acquisition unit that acquires a distance between the operation surface and the operation body;
   a display control unit that detects a movement of the operation body on the operation surface, and switches the display screen;
   a guide unit that is arranged at a position separated from the operation surface by a predetermined distance along a direction toward the operation surface, and has a predetermined length;
   a mode switching operation detection unit that detects the movement of the operation body along the guide unit; and
   a mode switching unit that switches between an aerial operation prohibition mode for reflecting only the movement of the operation body, in which a distance between the operation surface and the operation body is within a predetermined distance, on a switching operation of the display screen, and an aerial operation permission mode for additionally reflecting an operation of the moving body, in which the distance between the operation surface and the operation body exceeds the predetermined distance, on the switching operation of the display screen, wherein:
   the mode switching unit switches the aerial operation prohibition mode to the aerial operation permission mode when the mode switching operation detection unit detects that the operation body moves along the guide unit.

2. An input device mounted on a vehicle with a display device, the input device comprising:
   an operation surface, on which an operation body performs an input for switching a display screen of the display device;
   a distance acquisition unit that acquires a measurement value, which varies according to a distance between the operation surface and the operation body;
   an operation region setting unit that sets a first operation region, in which the distance between the operation surface and the operation body is less than a threshold value, and a second operation region, in which the distance between the operation surface and the operation body is equal to or greater than the threshold value;

a display screen switching unit that detects a movement of the operation body in the first operation region or the second operation region as a moving operation, and switches the display screen;
a prohibition state setting unit that sets a prohibition state that the display screen is not switched by the moving operation in the second operation region;
a signal determination unit that receives a predetermined signal from a switching operation unit arranged at a position separated from an area above the operation surface, and determines whether the signal is a prohibition state cancellation signal for canceling the prohibition state; and
a prohibition state cancellation unit that cancels the prohibition state when the signal determination unit determines that the signal is the prohibition state cancellation signal, wherein
the switching operation unit is a guide unit, which has a predetermined length, and is arranged at a position separated from the operation surface by a predetermined distance along a direction toward the operation surface and
the prohibition state cancellation signal is generated based on the movement of the operation body along the guide unit.

3. The input device according to claim 2, wherein:
the signal determination unit distinctively detects a driver side signal received from a driver seat side switching operation unit, which is arranged on a driver side of a center console panel of the vehicle, and a passenger seat side signal received from a passenger seat side switching operation unit, which is arranged on a passenger seat side of the center console panel and is different from the driver seat side switching operation unit;

when the prohibition state cancellation unit cancels the prohibition state according to a result that the signal determination unit detects the driver side signal, the display screen switching unit does not permit a specific switching operation among a plurality of switching operations on the display screen while the vehicle is moving; and
when the prohibition state cancellation unit cancels the prohibition state according to a result that the signal determination unit detects the passenger seat side signal, the display screen switching unit permits the specific switching operation among the plurality of switching operations on the display screen.

4. The input device according to claim 2, wherein:
the display screen switching unit sets a switching operation mode of the display screen due to the movement of the operation body to be different between a case where the operation body is positioned within the first operation region and a case where the operation body is positioned within the second operation region.

5. The input device according to claim 2, wherein:
the operation region setting unit sets the threshold value to be variable, and sets the threshold value to be different between a case where the operation body is positioned within the first operation region and a case where the operation body is positioned only within the second operation region.

6. The input device according to claim 2, wherein:
the prohibition state setting unit resets the prohibition state when a predetermined period of time elapses after the moving operation in the first operation region and the second operation region is terminated.

7. The input device according to claim 2, wherein:
the guide unit includes a light emitting unit.

* * * * *